United States Patent [19]

Dore et al.

[11] Patent Number: 4,742,160
[45] Date of Patent: May 3, 1988

[54] SULFO GROUP-CONTAINING BASIC AZO COMPOUNDS HAVING A CENTRAL 1,3,5-TRIAZINE RING AND TWO TERMINAL 1-HYDROXYNAPHTHYL-2 GROUPS AND 1:1 AND 1:2 METAL COMPLEXES THEROF

[75] Inventors: Jacky Dore, Basel; Reinhard Pedrazzi, Allschwil, both of Switzerland

[73] Assignee: Sandoz Ltd., Basle, Switzerland

[21] Appl. No.: 834,976

[22] Filed: Feb. 28, 1986

Related U.S. Application Data

[63] Continuation of Ser. No. 670,628, Nov. 13, 1984, abandoned.

[30] Foreign Application Priority Data

Nov. 14, 1983 [DE] Fed. Rep. of Germany ....... 3341136

[51] Int. Cl.⁴ ................. C09B 35/18; C09B 44/08; C09B 45/24; C09B 45/26
[52] U.S. Cl. ................. 534/605; 534/560; 534/581; 534/582; 534/602; 534/604; 534/606; 534/625; 534/632; 534/634; 534/637; 534/701; 534/797; 534/803
[58] Field of Search ............... 534/625, 634, 637, 604, 534/605, 606, 701, 797, 803

[56] References Cited

U.S. PATENT DOCUMENTS 4,273,076  6/1981  Pedrazzi ................. 534/638 X
4,544,737 10/1985  Stohr et al. ................. 534/605

FOREIGN PATENT DOCUMENTS 3114088 10/1982  Fed. Rep. of Germany ...... 534/605
3133568  3/1983  Fed. Rep. of Germany ...... 534/605
2082615  3/1982  United Kingdom ................. 534/607

Primary Examiner—Floyd D. Higel
Attorney, Agent, or Firm—Gerald D. Sharkin; Richard E. Vila; Melvyn M. Kassenoff

[57] ABSTRACT

Metal-free compounds of the formula

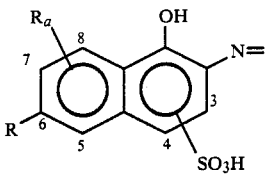

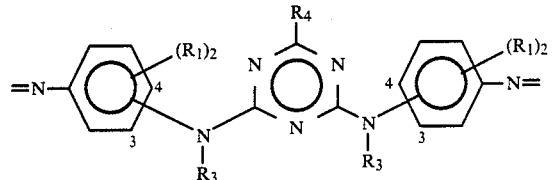

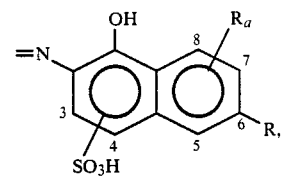

and 1:1 and 1:2 metal complexes thereof, and salts of the metal-free compounds and 1:1 and 1:2 metal complexes, where R is hydrogen, —$SO_3H$ or —$NR_5R_6$;
$R_a$ is hydrogen or —$NR_5R_6$;
$R_1$ is hydrogen, halogen, —OH, $C_{1-4}$alkyl, $C_{1-4}$alkoxy or —$SO_3H$;
$R_3$ is hydrogen or $C_{1-4}$alkyl;
$R_4$ is halogen, —OH, $C_{1-4}$alkyl, $C_{1-4}$alkoxy, phenyl, —$NH_2$, an aliphatic, cycloaliphatic or aromatic amino group, a heterocyclic amino group containing 1 to 3 hereto atoms or a hydrazino group,
$R_5$ is hydrogen or $C_{1-4}$alkyl; and
$R_6$ is an organic radical, are useful as cationic dyes for dyeing and printing fibers, threads and textile materials comprising, for example, a natural or regenerated cellulosic material such as cotton, a modified synthetic polyamide or polyester, and a homo- or copolymer of acrylonitrile or 1,1-dicyanoethylene, bast fibers such as hemp and particularly paper and leather.

18 Claims, No Drawings

SULFO GROUP-CONTAINING BASIC AZO COMPOUNDS HAVING A CENTRAL 1,3,5-TRIAZINE RING AND TWO TERMINAL 1-HYDROXYNAPHTHYL-2 GROUPS AND 1:1 AND 1:2 METAL COMPLEXES THEROF

This application is a continuation of application Ser. No. 670,628, filed Nov. 13, 1984, and now abandoned.

The invention relates to sulpho group-containing basic azo compounds for use in dyeing.

The invention provides compounds, in metal-free, 1:1 metal complex or 1:2 metal complex form and in free acid or acid addition salt form, of formula I

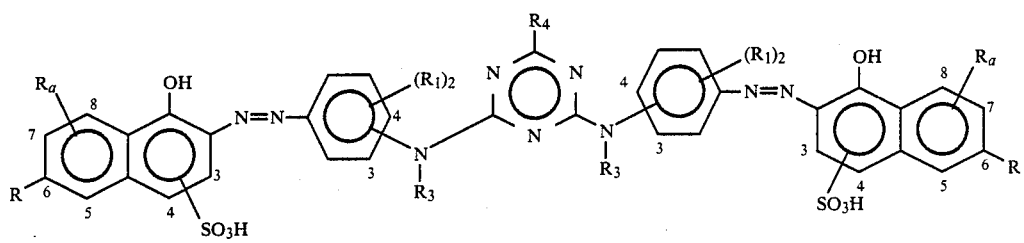

where
each R independently is hydrogen, —SO$_3$H or —NR$_5$R$_6$ and each R$_a$ independently is hydrogen or —NR$_5$R$_6$, provided that R and R$_a$ on the same naphthyl group are not both the same, one of R and R$_a$ on the same naphthyl group is —NR$_5$R$_6$, and when R is SO$_3$H R$_a$ on the same naphthyl ring is in the 8-position;
each R$_1$ independently is hydrogen, halogen, —OH, C$_{1-4}$alkyl, C$_{1-4}$alkoxy or —SO$_3$H;
each R$_3$ independently is hydrogen or C$_{1-4}$alkyl;
R$_4$ is halogen, —OH, C$_{1-4}$alkyl, C$_{1-4}$alkoxy, phenyl, —NH$_2$ or an aliphatic, cycloaliphatic, aromatic or heterocyclic amino group which may contain 1 to 3 hydrazino; or a hydrazine group in which the N-atom of the amino or hydrazino group is attached to the C-atom of the triazinyl group and the amino or hydrazino group can bear protonatable basic groups and/or quaternary N-atoms;
each R$_5$ independently is hydrogen or C$_{1-4}$alkyl;
each R$_6$ independently is a group of formula (a) or (b)

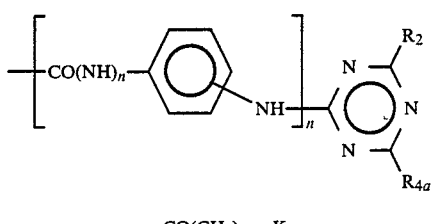

—CO(CH$_2$)$_m$—K$_a$ (b)

where
each n independently is 0 or 1 and each m independently is 1, 2, 3 or 4;
R$_2$ is an aliphatic, cycloaliphatic, aromatic or heterocyclic amine group in which the N-atom is attached to the C-atom of the triazinyl group and the amino or hydrazino group can bear protonatable basic groups and/or quaternary N-atoms;
R$_{4a}$ has a significance of R$_4$ independent of R$_4$, K$_a$ is —N(R$_7$)$_2$, —N$^\oplus$(R$_8$)$_2$R$_9$A$^\ominus$, —N$^\oplus$(R$_8$)$_2$—A—N(R$_7$)$_2$A$^\ominus$ or —N$^\oplus$(R$_8$)$_2$—A—N$^\oplus$(R$_8$)$_2$R$_9$2A$^\oplus$, where
each R$_7$ independently is hydrogen; unsubstituted C$_{1-6}$alkyl; C$_{2-6}$alkyl substituted by one of —OH, —CN and halogen; phenyl(C$_{1-3}$alkyl), the phenyl group of which is unsubstituted or substituted by 1 to 3 substituents selected from halogen, C$_{1-4}$alkyl and C$_{1-4}$alkoxy; or C$_{5-6}$cycloalkyl unsubstituted or substituted by 1 to 3 C$_{1-4}$alkyl groups or both R$_7$'s together with the N-atom to which they are attached form a five- or six-membered saturated heterocyclic ring containing one to three heteroatoms or pyrrolyl;

each R$_8$ independently has a non-cyclic or cyclic significance of R$_7$ except hydrogen; and each R$_9$ independently is C$_{1-4}$alkyl unsubstituted or monosubstituted by phenyl, —CONH$_2$ or unsubstituted cyclohexyl or C$_{2-4}$alkyl monosubstituted by —OH, halogen or —CN; or C$_{3-8}$alkenyl or (C$_{1-4}$alkyl)carbonylmethyl;

or both R$_8$'s and R$_9$'s together with the N-atom to which they are attached form a group of the formula

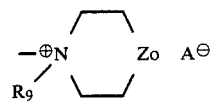

where Z$_o$ is

—O—, a direct bond, —CH$_2$—, —NH—, —NC$_{1-4}$alkyl,

—N$^\oplus$(C$_{1-4}$alkyl)$_2$ A$^\ominus$, —SO$_2$—, —SO—, —S— or

—N—(CH$_2$)$_{2-3}$—NH$_2$;

or a heterocyclic amino group, unsubstituted or substituted by 1 to 3 C$_{1-4}$alkyl groups (e.g., pyridinium, unsubstituted or substituted by 1 to 3 C$_{1-4}$alkyl, preferably C$_{1-2}$alkyl, groups);

each A independently is C$_{1-12}$alkylene uninterrupted or interrupted by 1 to 3 heteroatoms; or unsubstituted C$_{3-8}$alkenylene; and A$^\ominus$ is a non-chromophoric anion;
with the provisos:
(i) that the sum of cationic and protonatable basic groups exceeds the sum of sulpho and anionic groups by at least one;

(ii) that the sulpho groups on the naphthyl groups are in the 3- or 4-position (shown);

(iii) that the —NR$_3$— groups on the phenyl rings are in the 3- or 4-position (shown);

(iv) that when both R's are —NR$_5$R$_6$, both R$_6$'s are a group of formula (a) and both n's are zero, then both —NR$_3$— groups are in the 3-position (shown) on the phenyl rings.

For the avoidance of doubt the invention includes mixtures of one or more compounds of formula I above.

Preferably when one or both R$_6$'s are a group of formula (a) and n=0 then R$_2$ and R$_{4a}$ are not piperazine.

Any aromatic amino group present is preferably anilino, the phenyl ring of which is unsubstituted or substituted by one to three substituents selected from C$_{1-4}$alkyl, C$_{1-4}$alkoxy, halogen, hydroxy and phenoxy.

Any heterocyclic amino group present is preferably a pyridine (when unsaturated) or a morpholine pyrrolidine, piperidine or piperazine group (when saturated). Each group may be substituted by one to three C$_{1-4}$alkyl groups.

Preferred compounds of formula I are those in metal-free or 1:1 or 1:2 metal complex form or in free acid or acid addition salt form of formulae II and III

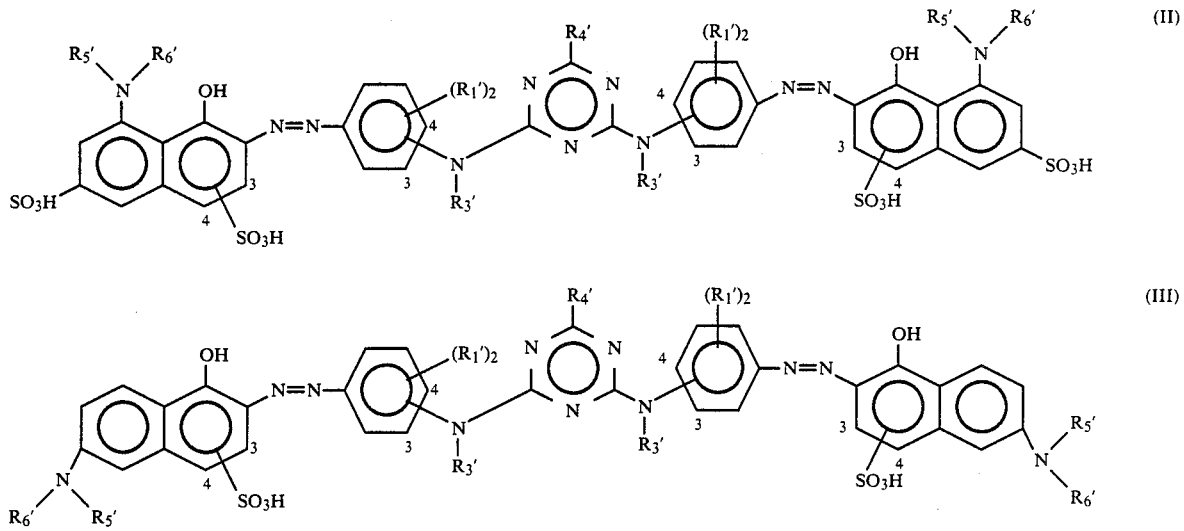

Where any symbol appears more than once in a formula unless indicated to the contrary its significances are independent of one another.

Any alkyl, alkylene or alkenylene present is linear or branched unless indicated otherwise. The alkyl group of any alkoxy group is linear or branched unless indicated to the contrary.

In this specification halogen means fluorine, chlorine, bromine or iodine, preferably chlorine.

In this specification any alkyl is preferably C$_{1-4}$alkyl, more preferably methyl or ethyl, most preferably methyl, and any alkoxy is preferably C$_{1-4}$alkoxy, more preferably methoxy or ethoxy, most preferably methoxy.

Any sulpho group present may be in free acid or salt form. When in salt form the —SO$_3^\ominus$ is balanced by a cation M$^\oplus$ (where M$^\oplus$ is a non-chromophoric cation, for example Na$^\oplus$, K$^\oplus$ or NH$_4^\oplus$) or by a protonated basic non-cationic group or by a cationic group in the molecule.

Unless otherwise indicated the preferred significance of a variable applies to that variable regardless of where the variable is set forth in the specification.

Any aliphatic amino group is preferably a mono-C$_{1-4}$alkyl- or di-(C$_{1-4}$alkyl)-amino group; each alkyl group independently is unsubstituted or substituted by 1 to 3 substituents selected from halogen, phenyl, hydroxy and C$_{5-6}$cycloalkyl, preferably unsubstituted or monosubstituted by phenyl or hydroxy, any hydroxy being other than in the α-position.

Any cycloaliphatic amino group present is preferably C$_{5-6}$-cycloalkylamino, the cycloalkyl group of which may be substituted by one or two C$_{1-2}$alkyl groups.

in which

R$_1'$ is hydrogen, Cl, Br, —CH$_3$, —OCH$_3$ or —SO$_3$H;

R$_3'$ is hydrogen or —CH$_3$;

R$_4'$ is Cl, Br, —NH$_2$, —CH$_3$, —OH, phenyl, —OCH$_3$,

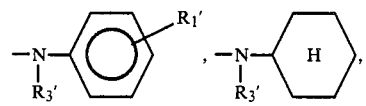

N-C$_{1-4}$alkyl-N-C$_{3-4}$alkylamino, bis-(hydroxyC$_{2-4}$alkyl)amino,

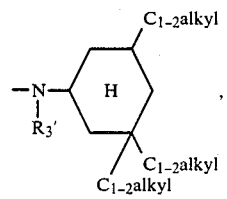

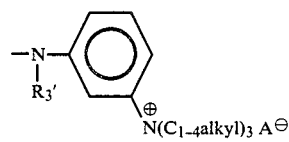

or

R$_2'$ defined below;

R$_5'$ is hydrogen, methyl or ethyl;

R$_6'$ is

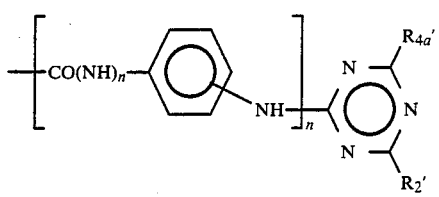

or

—CO(CH$_2$)$_{m'}$—K$_a'$ (b'), where m' is 1, 2 or 3;

R$_{4a}'$ has a significance of R$_4'$ independent of R$_4'$;

R$_2'$ is

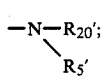

where R$_{20}'$ is C$_{1-12}$alkyl, unsubstituted or substituted by one —OH and uninterrupted or interrupted by one to three groups selected from —N(R$_7$)— and

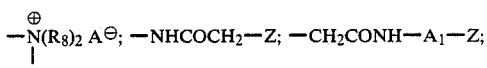

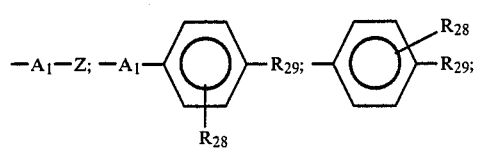

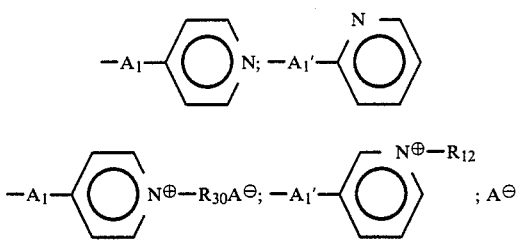

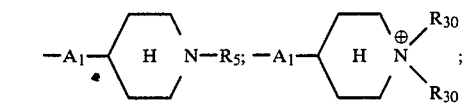

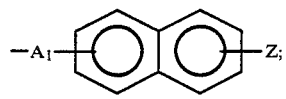

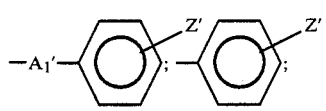

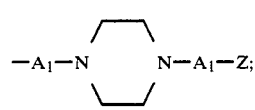

(a')

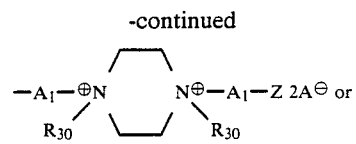

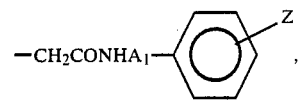

where

A$_1$ is C$_{1-8}$alkylene uninterrupted or interrupted by

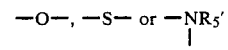

or a C$_{3-8}$alkenylene;

Z is —N(R$_7$)$_2$, —N$^\oplus$(R$_8$)$_2$R$_9$A$^\ominus$, —A$_1$—Z$_1$, —CO—NH—A$_1$—Z$_1$, —NH—CO—A$_1$—Z$_1$, —CO—A$_1$—Z$_1$, —SO$_2$—NH—A$_1$—Z$_1$ or —NHNHCOCH$_2$—Z$_1$;

R$_{28}$ is halogen, —OH, —NO$_2$, C$_{1-4}$alkyl or C$_{1-4}$alkoxy;

R$_{29}$ is —N(R$_7'$)$_2$, —N$^\oplus$(R$_8'$)$_2$R$_9'$A$^\ominus$, —CO—A$_2$—Z$_1$, —NHCO—A$_2$—Z$_1$, —CONH—A$_2$—Z$_1$, —SO$_2$NH—A$_2$—Z$_1$, —A$_2$—Z$_1$ or —NHNHCOCH$_2$—Z$_1$;

A$_2$ is C$_{1-8}$alkylene;

R$_{30}$ is C$_{1-4}$alkyl;

Z$_1$ is —N(R$_7'$)$_2$ or —N$^\oplus$(R$_8'$)$_2$R$_9'$A$^\ominus$, where

A$_1'$R$_7'$, R$_8'$, R$_9'$ and R$_{12}'$ are defined below; or

R$_2'$ is a group of the formula

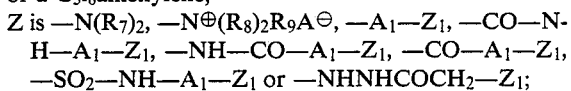

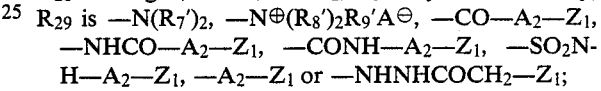

where

R$_{12}$ is C$_{1-4}$alkyl;

R$_{13}$ is hydrogen or C$_{1-4}$alkyl unsubstituted or substituted by —NH$_2$;

K$_a'$ is —N(R$_7'$)$_2$, —N$^\oplus$(R$_8'$)$_2$R$_9'$A$^\ominus$, —N$^\oplus$(R$_8'$)$_2$—A—N(R$_7'$)$_2$A$^\ominus$ or —N$^\oplus$(R$_8'$)$_2$—A—N$^\oplus$(R$_8'$)$_2$R$_9'$2A$^\ominus$;

R$_7'$ is hydrogen, linear or branched C$_{1-4}$alkyl, linear hydroxyC$_{2-3}$alkyl, 2-cyanoethyl, 2-chloroethyl or phenyl(C$_{1-3}$alkyl), the phenyl group of which is unsubstituted or substituted by 1 to 3 substituents selected from Cl, —CH$_3$ and —OCH$_3$;

or both R$_7'$'s together with the N-atom to which they are attached form an unsubstituted morpholine, piperidine, pyrrolidine, piperazine or N-methylpiperazine group;

R$_8'$ has a non-cyclic or a cyclic significance of R$_7'$ other than hydrogen; and R$_9'$ is methyl, ethyl, propyl, cyanoethyl, hydroxyethyl, chloroethyl, benzyl, —CH$_2$—CH=CH$_2$, —CH$_2$—CO—CH$_3$, —CH$_2$CONH$_2$ or $R_6''$ is

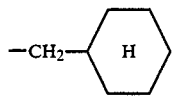

or both $R_8$'s and $R_9'$ together with the N-atom to which they are attached form unsubstituted pyridine, picoline, lutidine or or

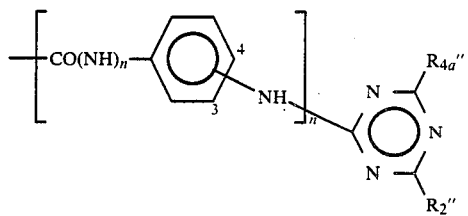

where $R_{15}$ is methyl or ethyl and $Z_o'$ is

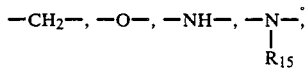

or —CO—$(CH_2)_{m''}$—$K_a''$, where
$m''$ is 1 or 2;
$R_{4a}''$ has a significance of $R_4''$ independently of $R_4''$;
$R_2''$ is

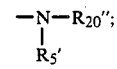

where $R_{20}''$ is

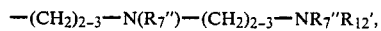

$-\overset{\oplus}{N}(R_{15})_2 A^{\ominus}$ or a direct bond;

with the provisos (i) that in the compounds of formulae II and III the sum of cationic and protonatable basic groups exceeds the sum of sulpho groups and anionic groups by at least one;

(ii) that in the compounds of formulae II and III the floating sulpho groups on the naphthyl groups are in the 3- or 4-position (shown);

(iii) that in the compounds of formulae II and III the floating —$NR_3'$— groups are in the 3- or 4-position (shown); and (iv) that in the compounds of formula III when both $R_6''$s are a group of formula a' and both n's are zero, then both —$NR_3'$- groups are in the 3-position on the phenyl groups and $R_2'$ and $R_{4a}'$ are not piperazine rings.

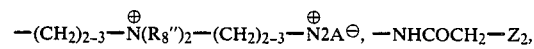

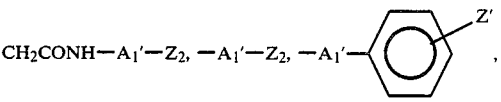

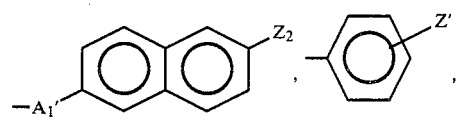

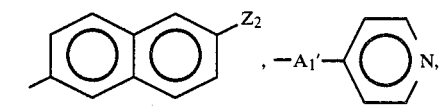

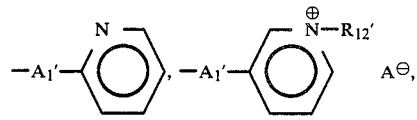

More preferred compounds of formula I are those, in metal-free, 1:1 metal complex or 1:2 metal complex form or in free acid or acid addition salt form, of formulae IIa and IIIa

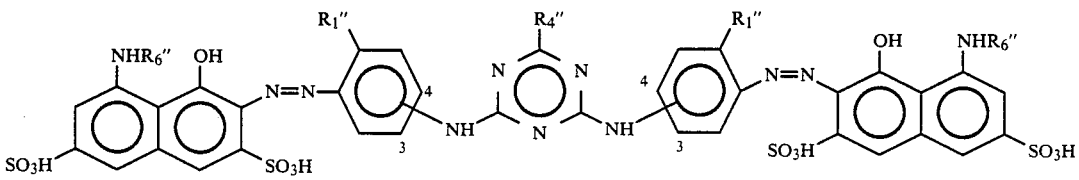

(IIa)

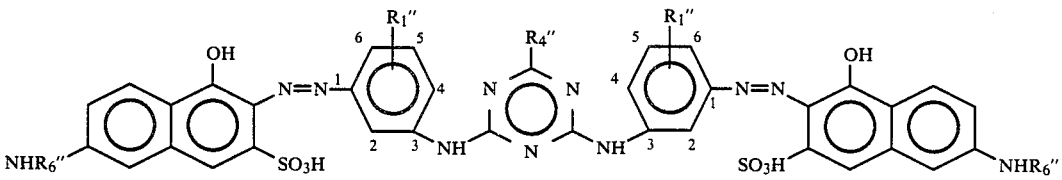

(IIIa)

in which
$R_1''$ is hydrogen, methyl, —$SO_3H$ or —$OCH_3$;
$R_4''$ is Cl, —$NH_2$, —$CH_3$, —$OCH_3$, —OH, —$N(C_2H_4OH)_2$, —$NHC_2H_4OH$ or $R_2''$ (defined below);

-continued

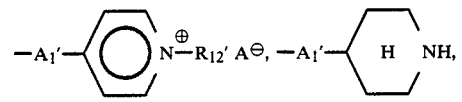

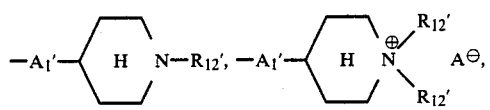

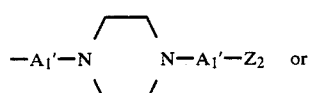

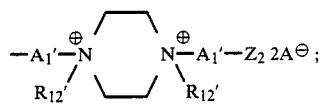

or $R_2''$ is

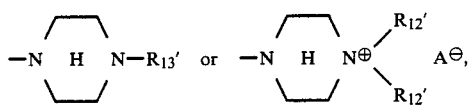

where
$A_1'$ is $C_{1-8}$alkylene uninterrupted or interrupted by

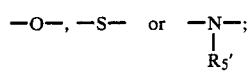

$Z'$ is $-N(CH_3)_2$, $-\overset{\oplus}{N}(CH_3)_3 A^\ominus$, $-CONH-A_1'-Z_2$, $-SO_2NH-A_1'-Z_2$, $-A_1-Z_2$, $-NHNHCOCH_2-Z_2$ or $-CO-A_1'-Z_2$;

$R_{12}'$ is methyl or ethyl;
$R_{13}'$ is hydrogen, methyl or $-C_2H_4NH_2$;
$Z_2$ is $-N(R_7'')_2$ or $-N^\oplus(R_8'')_2R_9''A^\ominus$;
$K_a''$ is $-N(R_7'')_2$, $-N^\oplus(R_8'')_2-A_3-N(R_7'')_2$, $-N^\oplus(R_8'')_2-A_3-N^\oplus(R_8'')_2R_9''2A^\ominus$ or $-N^\oplus(R_8'')_2R_9''A^\ominus$,
$A_3$ is $-(CH_2)_s-$, $-(CH_2)_2-N(CH_3)-(CH_2)_2-$, $-CH_2-\underset{H}{C(CH_3)}-CH_2-$ or $-CH_2-\underset{CH_3}{CH}-$, where s is an integer from 2 to 6, inclusive;

$R_7''$ is hydrogen, methyl or ethyl (more preferably methyl or ethyl) or both $R_7'''$s together with the N-atom to which they are attached form an unsubstituted morpholine, piperidine, pyrrolidine, piperazine or N-methylpiperazine ring.

$R_8''$ is methyl or ethyl; and
$R_9''$ is methyl, ethyl or benzyl; or both $R_8'''$s $R_9''$ and the N-atom to which they are attached form an unsubstituted pyridine or picoline group (attached by the N-atom) or

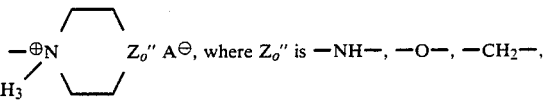

$-\underset{|}{N}(CH_3)$ or $-\overset{|}{\underset{\oplus}{N}}(CH_3)_2 A^\ominus$, with the provisos:

(i) that the sum of cationic and/or protonatable basic groups is greater than the some of the sulpho and aionic groups present by at least one;
(ii) that $R_2''$ and $R_{4a}''$ are not piperazine rings; and
(iii) that $R_1''$ in the compounds of formula IIIa is in the 4- or 6-position shown.

Preferred metallisable groups are $-NH_2$, $-OH$ and $-O-C_{1-4}$alkyl which are situated ortho to an azo bridge on a benzo or a phenyl group. Metallisation of such groups can be represented as follows:

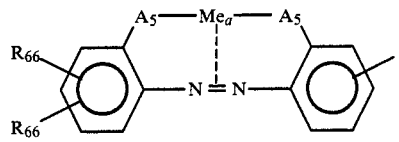

in which
each $A_5$ independently is $-O-$ or $-NH-$;
$Me_a$ is a 1:1 or 1:2 metal complex-forming metal, and both $R_{66}$'s are ortho to each other and together form an aromatic ring system (for example together with the two carbon atoms to which they attached form a

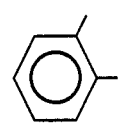

group).

Preferred compounds of formula I in metallised form are those in free acid or acid addition salt form of formulae II' and III'

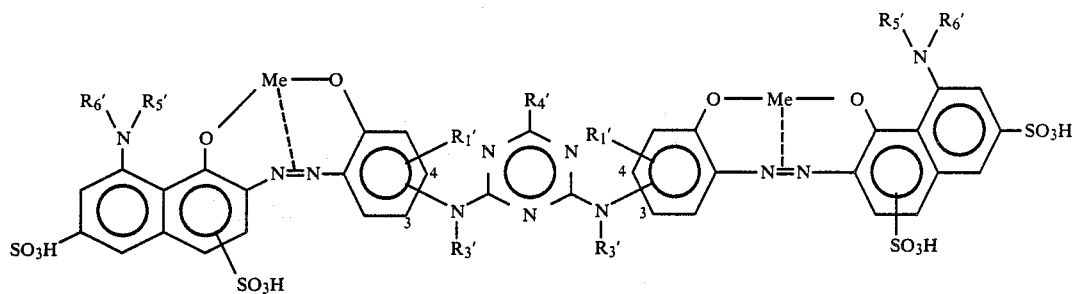

(II')

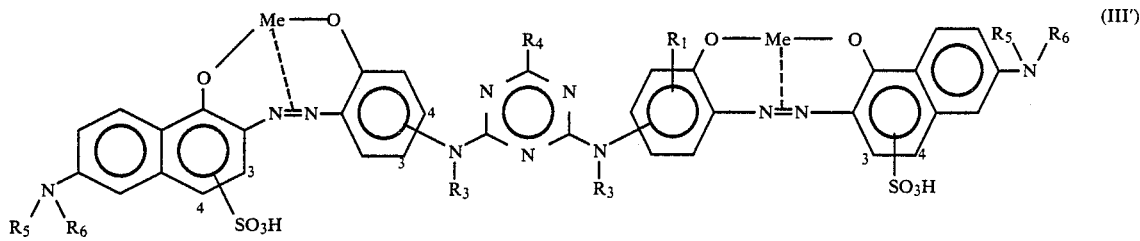

(III')

where the symbols $R_1$, $R_3$, $R_4$, $R_5$ and $R_6$ are as defined above and Me is a 1:1 or 1:2 complex-forming metal atom,
with the provisos that:
(i) in the compounds of formulae II' and III' the sum of cationic and protonatable basic groups exceeds the sum of sulpho and anionic groups by at least one;
(ii) in the compounds of formulae II' and III' the floating sulpho groups are in the 3- or 4-position (shown);
(iii) in the compounds of formulae II' and III' the floating groups

are in the 3- or 4-position (shown); and
(iv) in the compounds of formula III' when both $R_6$'s are the groups of formula (a) and n is zero then the

groups are in the 3-position (shown).

Preferably Me is copper, chromium, cobalt, nickel or manganese when a 1:1 complex-forming metal and is chromium, cobalt, iron or nickel when a 1:2 complex-forming metal.

In the above formulae:
$R_1$ is preferably $R_1'$;
$R_2$ is preferably $R_2'$, more preferably $R_2''$;
$R_3$ is preferably $R_3'$;
$R_4$ is preferably $R_4'$, more preferably $R_4''$;
$R_5$ is preferably $R_5'$, more preferably hydrogen;
$R_6$ is preferably $R_6'$, more preferably $R_6''$;
m is preferably m', more preferably m'';
$R_7$ is preferably $R_7'$, more preferably $R_7''$;
$R_8$ is preferably $R_8'$, more preferably $R_8''$;
$R_9$ is preferably $R_9'$, more preferably $R_9''$;
A is preferably $A_1$, more preferably $A_1'$;
$R_{12}$ is preferably $R_{12}'$;
$Z_1$ is preferably $Z_2$;
$R_{13}$ is preferably $R_{13}'$; and $R_{15}$ is preferably methyl;

Preferably the floating sulpho group on the naphthyl rings is in the 3-position.

$R_2$ and/or $R_4$ when an aliphatic amino group are or is preferably mono($C_{1-4}$alkyl)amino, di-($C_{1-2}$alkyl)amino, monohydroxy$C_{1-4}$alkylamino or —N($C_2H_4OH$)$_2$, more preferably —N($C_2H_4OH$)$_2$ or —NCH$_2$H$_4$OH.

$R_2$ and/or $R_4$ when an aromatic amino group are or is preferably

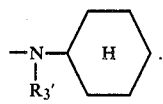

$R_2$ and/or $R_4$ when a cycloaliphatic amino group are or is preferably

$R_7$, $R_8$ and/or $R_9$ when a substituted alkyl are or is hydroxy-$C_{2-3}$alkyl, phenyl($C_{1-3}$alkyl), 2-cyanoethyl or 2-chloroethyl.

$R_9$ when alkyl is preferably methyl, ethyl or propyl; more preferably methyl or ethyl.

$R_9$ when a substituted alkyl is more preferably 2-cyanoethyl, 2-hydroxyethyl, 2-chloroethyl or benzyl, most preferably benzyl.

A when an alkylene group is preferably $C_{1-8}$alkylene, uninterrupted or interrupted by one $$-\underset{|}{N}C_{1-4}$$

alkyl group (preferably —N(CH$_3$)—, more preferably uninterrupted $C_{1-4}$alkylene.

$R_{13}$, when —NH$_2$-substituted alkyl, is preferably —$C_2H_4NH_2$.

Compounds of formula I can be prepared by reacting one mole of a tetrazotised compound of formula X

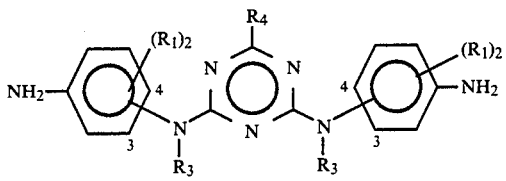

with 2 moles of a coupling component of formula XI

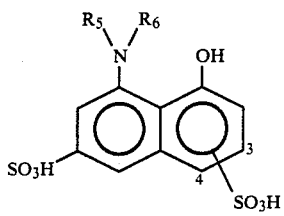

or with 2 moles of a coupling component of formula XII

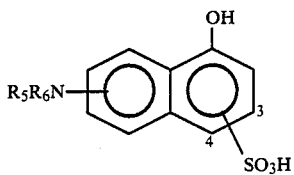

or 1 mole of a coupling component of formula XI and 1 mole of a coupling component of formula XII.

Compounds of formulae X, XI and XII are known or can be prepared from known compounds by known methods.

The —SO$_3$H groups can be converted to the salt form by known methods.

Coupling to form compounds of formula I can be carried out according to known methods. Advantageously, coupling is carried out in aqueous (acid, neutral or alkali) medium at a temperature from −10° C. to room temperature, if necessary in the presence of a coupling accelerator such as pyridine or urea. Alternatively, coupling may be effected in a mixture of solvents, for example water and an organic solvent.

Metallisation of compounds of formula I can be achieved by known methods.

The azo compounds of formula I in 1:1 metal complex form may be prepared by metallising compounds of formula I in metal-free form with a metal selected from copper, cobalt, iron, nickel, manganese, chromium and zinc.

The azo compounds of formula I in 1:2 metal complex form may be prepared by metallising compounds of formula I in metal-free form with a metal selected from chromium, nickel, cobalt and iron.

A further method for the preparation of an azo compound of formula I in 1:2 metal complex form comprises reacting an azo compound of formula I in metal-free form with an azo compound 1:1 metal complex when the metal is chromium, nickel, cobalt or iron.

The metallisation process to form a 1:1 metal complex is advantageously carried out by treating 1 mole of azo compound with a metallising agent containing 1 equivalent of metal.

Metallisation is carried out advantageously in aqueous medium or a mixture of water and a water-miscible organic solvent, for example acetone, lower alkyl alcohols, dimethylformamide, formamide, glycols or acetic acid at a pH range from 1.0 to 8.0, preferably pH 2 to 7. The metallisation process may be carried out at a temperature from room temperature to the boiling point of the reaction medium.

Alternatively, metallisation may be effected in a wholly organic medium (for example dimethylformamide). Advantageously, for instance, cobaltisation may be carried out in the presence of an inorganic nitrite such as lithium, sodium, ammonium or potassium nitrite in the ratio of 2 to 6 moles of nitrite per gram atom of cobalt.

Suitable cobalt-yielding compounds are, for example, cobalt (II) and Co (III) sulphate, acetate, formate and chloride.

Copper-yielding compounds are, for example, cupric sulphate, cupric formate, cupric acetate and cupric chloride.

The nickel-yielding compounds are Ni (II) and Ni (III) compounds, such as nickel formate, nickel acetate and nickel sulphate.

Preferred manganese-yielding compounds are Mn (II) compounds and iron-yielding compounds are Fe (II) and Fe (III) compounds. Examples of these and zinc-yielding compounds are manganese, iron and zinc formate, acetate and sulphate.

Preferred chromium-yielding compounds are Cr (II) and Cr (III) formate, acetate and sulphate.

In the compounds of formula I the anions A$^\ominus$ can be any nonchromophoric anions such as those conventional in basic dyestuff chemistry. Suitable anions include chloride, bromide, sulphate, bisulphate, methylsulphate, aminosulphonate, perchlorate, benzenesulphonate, oxalate, maleate, acetate, propionate, lactate, succinate, tartrate, malate, methanesulphonate and benzoate, as well as complex anions, for example, zinc chloride double salts and anions of boric acid, citric acid, glycollic acid, diglycollic acid and adipic acid or addition products of orthoboric acid with polyalcohols with at least one cis diol group present. These anions can be exchanged for each other by ion exchange resins or by reaction with acids or salts (for example via the hydroxide or bicarbonate or according to German Offenlegungsschrift Nos. 2,001,748 or 2,001,816).

The azo compounds in quarternised and/or salt form are useful as dyes.

The azo compounds of formula I in quaternised and/or salt form are suitably worked up into solid or liquid preparations, for example by granulation or by dissolving in a suitable solvent. The compounds of formula I in quaternised form and/or salt form are suitable for dyeing, padding or printing on fibres, threads or textile materials, particularly natural or regenerated cellulose materials, for example cotton, or synthetic polyamides or synthetic polyesters in which the acid groups have been modified. Such polyamides are described in Belgian Pat. No. 706,104 and such synthetic polyesters are described in U.S. Pat. No. 3,379,723.

The dyes of formula I may also be applied to bast fibres such as hemp, flax, sisal, jute, coir or straw.

The dyes of formula I are also used for dyeing, padding or printing fibres, threads or textiles produced therefrom which consist of or contain homo- or mixed polymers of acrylonitrile or of 1,1-dicyanoethylene.

The textile material is dyed, printed or pad-dyed in accordance with known methods. Acid modified-polyamide is dyed particularly advantageously in an aqueous, neutral or acid medium, at temperature of 60° C. to boiling point or at temperatures above 100° C. under pressure.

The textile material may also be dyed by the compounds of formula I in organic solvents, e.g. in accordance with the directions given in German Offenlegungsschrift No. 2,437,549.

Cellulose material is mainly dyed by the exhaust process, i.e. from a long or short bath, at room temperature to boiling optionally under pressure, whereby the ratio of the bath is from 1:1 to 1:100 and preferably from 1:20 to 1:50. If dyeing is effected from a short bath, then the liquor ratio is 1:5 to 1:15. The pH of the dye bath varies between 3 and 10 (for short and long dyebaths). Dyeing preferably takes place in the presence of electrolytes.

Printing may be effected by impregnation with a printing paste produced by known methods.

The dyes of formula I are also suitable for dyeing or printing paper, e.g. for the production of bulk-dyed, sized and unsized paper. The dyestuffs may similarly be used for dyeing paper by the dipping process. The dyeing of paper is effected by known methods.

The dyes of formula I are also suitable for dyeing or printing leather by known methods.

Dyeings with good fastness are obtained on both paper and leather.

Dyeings made with the dyes of formula I on leather have good light fastness properties, good diffusion properties with PVC, good water-, wash- and sweat-fastness properties, good fastness to dry cleaning, good fastness to drops of water and good fastness to hard water.

Dyeings prepared with dyes of formula I on paper produce a substantially clear spent liquor which is important for environmental reasons. The dyes of formula I have good build-up properties and are of high substantivity, do not run once applied to paper and are not pH sensitive. Dyeings produced with dyes of formula I have good light fastness and the nuance on exposure for a long time to light fades tone-in-tone. The dyes of formula I have good wet-fastness properties not only for water but also for milk, soap, water, sodium chloride solution, fruit juice and sweetened mineral water. Further, dyeings made with the dyes of formula I are fast for alcoholic beverages due to a good alcohol fastness. Further the dyes of formula I have good nuance stability.

The dyes of formula I may be converted into dyeing preparations. Processing into stable liquid or solid dyeing preparations may take place in a generally known manner, advantageously by grinding or granulating or by dissolving in suitable solvents, optionally adding an assistant, e.g. a stabiliser or dissolving intermediary such as urea. Such preparations may be obtained, for example, as described in French Patent Specifications Nos. 1,572,030 and 1,581,900 or in accordance with German DOS Nos. 2,001,748 and 2,001,816.

Liquid preparations of the compounds of formula I preferably comprise 10 to 30% by weight of a compound of formula I and up to 30% of a solubilising agent such as urea, lactic acid or acetic acid, the rest of the composition being water. Solid preparations preferably comprise 20 to 80% dyestuff, 20 to 80% solubilising agent such as urea or $Na_2SO_4$ and 2 to 5% water.

The invention will now be illustrated by the following Examples in which all parts and percentages are by weight and all temperatures are in °C. unless indicated to the contrary.

EXAMPLE 1

4.2 g of the diamine of formula 1a

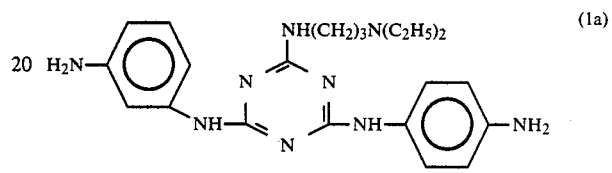

are tetrazotised by known methods and coupled in aqueous medium at a pH of 3.5 and at a temperature of 10°–20° to 11.5 g of the compound of formula 1b

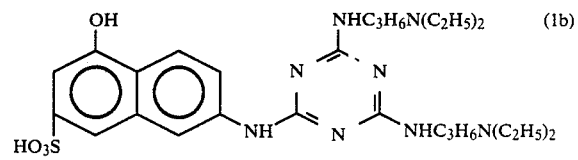

The resulting dyestuff dyes paper a scarlet tone and the dyeings so produced have good wet and light fastness properties. The resulting dyestuff has a high substantivity.

The compound of formula 1a can be prepared by reacting 2 moles of an aminonitrobenzene with cyanuric chloride in aqueous medium to form the corresponding dinitro compound in which the chloroatom is replaced by reacting with $NH_2-C_3H_6N(C_2H_5)_2$ at 70° to 90° in aqueous or organic solution followed by reducing the nitro groups by the Béchamps reduction.

EXAMPLE 2

Instead of using the compound of formula 1b in the process of Example 1, 9.0 g of the compound of formula 2a

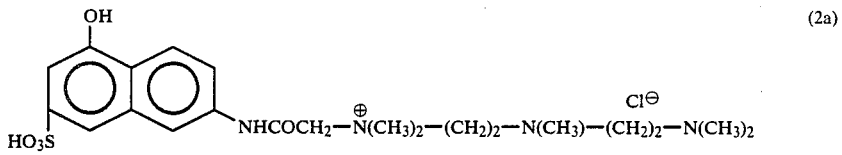

are used. The resulting compound dyes paper a red tone and has good fastness properties.

EXAMPLE 3

Instead of using the compound of formula 1a in the method of Example 1, 4.3 g of the compound of formula 3a

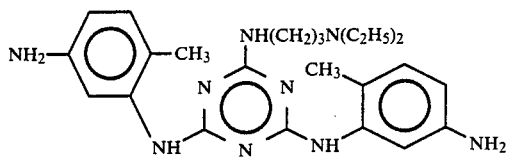

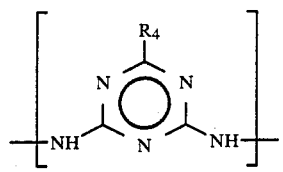

can be used.

The resulting brilliant scarlet dye dyes paper a red colour and the dyeings so produced have good properties.

EXAMPLES 4 TO 64

Compounds of the formula

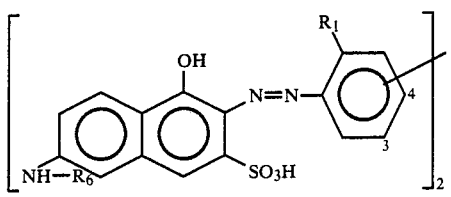

in which $R_1$, $R_4$ and $R_6$ are given in Table 1 below and the position of the floating bond from the triazinyl group to the phenyl rings is given in column S, can be made by a method analogous to that of Example 1.

Dyeings made on paper with the compounds of Examples 53 and 56 are bordeaux red nuance; those made with the compounds of Examples 4, 5, 6 to 16, 18, 20, 21, 45 to 48, 50, 52 and 58 to 64 are a scarlet nuance; those made with the compounds of Examples 17, 19, 22 to 44 are a scarlet red nuance; those made with compounds of Examples 49, 54 and 57 are an orange nuance and those made with compounds of Examples 52 and 55 are a blueish-red nuance.

TABLE 1

| EX. NO. | S | $R_6$ | $R_4$ | $R_1$ |
|---|---|---|---|---|
| 4 | 3,3 | ![triazine with NHC3H6N(C2H5)2 groups] | —N(morpholino, H O) | H |
| 5 | 3,3 | ![triazine with NHC3H6N(C2H5)2 groups] | —N(N-methylpiperazino, H N—CH3) | H |
| 6 | 3,3 | ![triazine with NHC3H6N(C2H5)2 groups] | —NHCH2CH2OH | H |
| 7 | 3,3 | ![triazine with NHC3H6N(C2H5)2 groups] | —NHCH2CH2NH2 | H |
| 8 | 3,3 | ![triazine with NHC3H6N(C2H5)2 groups] | —NH(CH2)2NH(CH2)2NH2 | H |
| 9 | 3,3 | ![triazine with NHC3H6N(C2H5)2 groups] | —NH2 | H |

TABLE 1-continued

| EX. NO. | S | R₆ | R₄ | R₁ |
|---|---|---|---|---|
| 10 | 3,3 | NHC₃H₆N(C₂H₅)₂ triazine with NHC₃H₆N(C₂H₅)₂ 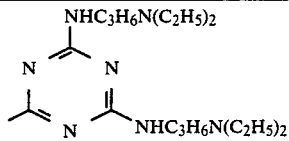 | —OH | H |
| 11 | 3,3 | NHC₃H₆N(C₂H₅)₂ triazine with NHC₃H₆N(C₂H₅)₂ 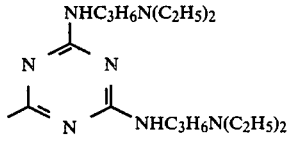 | —N⟨piperidine⟩ | H |
| 12 | 3,3 | NHC₃H₆N(C₂H₅)₂ triazine with NHC₃H₆N(C₂H₅)₂ 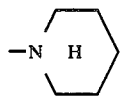 | —NHC₃H₆N(CH₃)₂ | H |
| 13 | 3,3 | NHCOCH₂N⁺(CH₃)₃ A⁻ triazine with NHCOCH₂N⁺(CH₃)₃ A⁻ 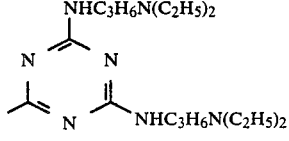 | —NHC₃H₆N(C₂H₅)₂ | H |
| 14 | 3,3 | NHCOCH₂N⁺(CH₃)₃ A⁻ triazine with NHCOCH₂N⁺(CH₃)₃ A⁻ 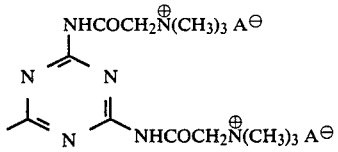 | —NH₂ | H |
| 15 | 3,3 | NHNHCOCH₂N⁺(CH₃)₃ A⁻ triazine with NHNHCOCH₂N⁺(CH₃)₃ A⁻ 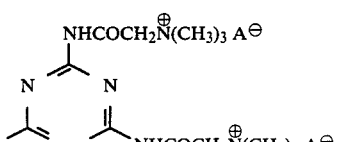 | —N⟨morpholine⟩ | H |
| 16 | 3,3 | NHNHCOCH₂N⁺(CH₃)₃ A⁻ triazine with NHNHCOCH₂N⁺(CH₃)₃ A⁻ 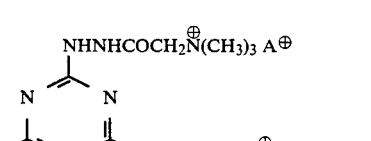 | —NHC₃H₆N(C₂H₅)₂ | H |
| 17 | 3,3 | —COCH₂N⁺(CH₃)₂—(CH₂)₃—N(CH₃)₂ A⁻ | —NHC₃H₆N(C₂H₅)₂ | H |
| 18 | 3,3 | —COCH₂N⁺(CH₃)₂—(CH₂)₃—N(CH₃)₂ A⁻ | —N⟨morpholine⟩ 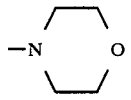 | H |
| 19 | 3,3 | —COCH₂N⁺(CH₃)₂—(CH₂)₃—N(CH₃)₂ A⁻ | —N⟨N-methylpiperazine⟩ 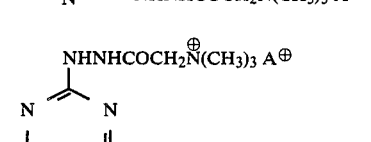 | H |
| 20 | 3,3 | —COCH₂N⁺(CH₃)₂—(CH₂)₃—N(CH₃)₂ A⁻ | —N⟨piperidine⟩ 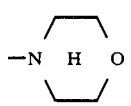 | H |
| 21 | 3,3 | —COCH₂N⁺(CH₃)₂—(CH₂)₃—N(CH₃)₂ A⁻ | —NHC₃H₆OCH₃ | H |

TABLE 1-continued

| EX. NO. | S | $R_6$ | $R_4$ | $R_1$ |
|---|---|---|---|---|
| 22 | 3,3 | $-COCH_2\overset{\oplus}{\underset{CH_3}{\overset{CH_3}{N}}}-(CH_2)_2-N(CH_3)-(CH_2)_2-N(CH_3)_2 \quad A^{\ominus}$ | $-NHC_3H_6OCH_3$ | H |
| 23 | 3,3 | $-COCH_2\overset{\oplus}{\underset{CH_3}{\overset{CH_3}{N}}}-(CH_2)_2-N(CH_3)-(CH_2)_2-N(CH_3)_2 \quad A^{\ominus}$ | $-NHCH_2CH_2NH_2$ | H |
| 24 | 3,3 | $-COCH_2\overset{\oplus}{\underset{CH_3}{\overset{CH_3}{N}}}-(CH_2)_2-N(CH_3)-(CH_2)_2-N(CH_3)_2 \quad A^{\ominus}$ | $-N\underset{}{\bigcirc}H$ (piperidine) | H |
| 25 | 3,3 | $-COCH_2\overset{\oplus}{\underset{CH_3}{\overset{CH_3}{N}}}-(CH_2)_2-N(CH_3)-(CH_2)_2-N(CH_3)_2 \quad A^{\ominus}$ | $-N\underset{}{\bigcirc}H\ O$ (morpholine) | H |
| 26 | 3,3 | $-COCH_2\overset{\oplus}{\underset{CH_3}{\overset{CH_3}{N}}}-(CH_2)_2-N(CH_3)-(CH_2)_2-N(CH_3)_2 \quad A^{\ominus}$ | $-N\underset{}{\bigcirc}N-CH_3$ (N-methylpiperazine) | H |
| 27 | 3,3 | $-COCH_2\overset{\oplus}{\underset{CH_3}{\overset{CH_3}{N}}}-(CH_2)_2-N(CH_3)-(CH_2)_2-N(CH_3)_2 \quad A^{\ominus}$ | $-NHCH_2CH_2OH$ | H |
| 28 | 3,3 | $-COCH_2\overset{\oplus}{N}(CH_3)_2(CH_2)_2N(CH_3)-(CH_2)_2N(CH_3)_2 \quad A^{\ominus}$ | $-N(CH_2CH_2OH)_2$ | H |
| 29 | 3,3 | $-COCH_2\overset{\oplus}{N}(CH_3)_2(CH_2)_2N(CH_3)(CH_2)_2N(CH_3)_2$ | $-NH\underset{}{\bigcirc}H$ (cyclohexyl) | H |
| 30 | 3,3 | $-COCH_2\overset{\oplus}{N}(CH_3)_2(CH_2)_2N(CH_3)(CH_2)_2N(CH_3)_2$ | $-NH(CH_2)_3OCH(CH_3)_2$ | H |
| 31 | 3,3 | $-COCH_2\overset{\oplus}{N}(CH_3)_2(CH_2)_2N(CH_3)(CH_2)_2N(CH_3)_2$ | $-NH(CH_2)_2NH(CH_2)_2NH_2$ | H |
| 32 | 3,3 | $-COCH_2\overset{\oplus}{N}(CH_3)_2(CH_2)_2N(CH_3)(CH_2)_2N(CH_3)_2$ | $-NHCH_2CHOHCH_2NH_2$ | H |
| 33 | 3,3 | $-COCH_2\overset{\oplus}{N}(CH_3)_2(CH_2)_2N(CH_3)(CH_2)_2N(CH_3)_2$ | $-NHCH_2-\underset{CH_3}{\overset{CH_3}{C}}-CH_2-\underset{CH_3}{\overset{CH_3}{N}}$ | H |
| 34 | 3,3 | $-COCH_2\overset{\oplus}{N}(CH_3)_2(CH_2)_4N(CH_3)_2 \quad A^{\ominus}$ | $-NHC_3H_6N(C_2H_5)_2$ | H |
| 35 | 3,3 | $-COCH_2\overset{\oplus}{N}(CH_3)_2(CH_2)_4N(CH_3)_2 \quad A^{\ominus}$ | $-N\underset{}{\bigcirc}H\ O$ (morpholine) | H |
| 36 | 3,3 | $-COCH_2-\overset{\oplus}{\underset{CH_3}{N}}\underset{}{\bigcirc}N-CH_3 \quad A^{\ominus}$ | $-NHC_3H_6N(C_2H_5)_2$ | H |
| 37 | 3,3 | $-COCH_2-\overset{\oplus}{\underset{CH_3}{N}}\underset{}{\bigcirc}N-CH_3 \quad A^{\ominus}$ | $-N\underset{}{\bigcirc}$ (piperidine) | H |

TABLE 1-continued

| EX. NO. | S | R$_6$ | R$_4$ | R$_1$ |
|---|---|---|---|---|
| 38 | 3,3 | —COCH$_2$—N$^{\oplus}$(CH$_3$)—piperazine—N—CH$_3$ A$^{\ominus}$ | —N(morpholine)O | H |
| 39 | 3,3 | —COCH$_2$—N$^{\oplus}$(CH$_3$)—piperazine—N—CH$_3$ A$^{\ominus}$ | —NHCH$_2$CH$_2$OH | H |
| 40 | 3,3 | —COCH$_2$—N$^{\oplus}$(CH$_3$)—piperazine—N—CH$_3$ A$^{\ominus}$ | —NHCH$_2$CH$_2$NH$_2$ | H |
| 41 | 3,3 | —COCH$_2$—N$^{\oplus}$(CH$_3$)—piperazine—N—CH$_3$ A$^{\ominus}$ | —NH-(3,3,5-trimethylcyclohexyl) | H |
| 42 | 3,3 | —COCH$_2$—N$^{\oplus}$(CH$_3$)—piperazine—N—CH$_3$ A$^{\ominus}$ | —NHCH$_2$CH$_2$NHCH$_2$CH$_2$OH | H |
| 43 | 3,3 | —COCH$_2$—N$^{\oplus}$(CH$_3$)—piperazine—N—CH$_3$ A$^{\ominus}$ | —NHCH$_2$CH$_2$OCH$_2$CH$_2$OH | H |
| 44 | 3,3 | —COCH$_2$—N$^{\oplus}$(CH$_3$)—piperazine—N—CH$_3$ A$^{\ominus}$ | —NH$_2$ | H |
| 45 | 3,3 | —COCH$_2$—N$^{\oplus}$(CH$_3$)—piperazine—N—CH$_3$ A$^{\ominus}$ | —N(piperazine)N—CH$_3$ | H |
| 46 | 3,3 | triazine with NHCH$_2$CH(CH$_3$)NH$_2$ substituents | —NHCH$_2$CH(CH$_3$)NH$_2$ | H |
| 47 | 3,3 | triazine with NHCH$_2$CH(CH$_3$)NH$_2$ substituents | —NHCH$_2$CH$_2$OH | H |
| 48 | 3,3 | triazine with NHCH$_2$CH(CH$_3$)NH$_2$ substituents | —N(piperazine)N—CH$_3$ | H |

TABLE 1-continued

| EX. NO. | S | R₆ | R₄ | R₁ |
|---|---|---|---|---|
| 49 | 3,3 | triazine with NHCH₂CH(CH₃)NH₂ substituents | —NH(CH₂)₃N(CH₃)₂ | SO₃H |
| 50 | 3,3 | triazine with NHCH₂CH(CH₃)NH₂ substituents | —NH(CH₂)₃N(C₂H₅)₂ | SO₃H |
| 51 | 3,3 | triazine with NHCH₂CH(CH₃)NH₂ substituents | —N⌒NH⌒N—CH₃ (N-methylpiperazine) | SO₃H |
| 52 | 3,3 | triazine with NHC₃H₆N(C₂H₅)₂ substituents | —N⌒NH⌒N—CH₃ | —CH₃ |
| 53 | 3,3 | triazine with NHC₃H₆N(C₂H₅)₂ substituents | —N⌒NH⌒N—CH₃ | —OCH₃ |
| 54 | 3,3 | triazine with NHC₃H₆N(C₂H₅)₂ substituents | —N⌒NH⌒N—CH₃ | —SO₃H |
| 55 | 3,3 | triazine with NHCH₂CH(CH₃)NH₂ substituents | —N⌒NH⌒N—CH₃ | —CH₃ |
| 56 | 3,3 | triazine with NHCH₂CH(CH₃)NH₂ substituents | —N⌒NH⌒N—CH₃ | —OCH₃ |
| 57 | 3,3 | triazine with NHCH₂CH(CH₃)NH₂ substituents | —N⌒NH⌒N—CH₃ | —SO₃H |
| 58 | 3,3 | triazine with NH(CH₂)₃N(C₂H₅)₂ and NHCH₂CH₂OH substituents | —N⌒NH⌒N—CH₃ | H |

TABLE 1-continued

| EX. NO. | S | R₆ | R₄ | R₁ |
|---|---|---|---|---|
| 59 | 3,3 | NH(CH₂)₃N(C₂H₅)₂ on triazine with NH-phenyl | −N(piperazine)N−CH₃ | H |
| 60 | 3,3 | Cl on triazine, NH(CH₂)₃N(C₂H₅)₂ | −N(piperazine)N−CH₃ | H |
| 61 | 3,3 | NH(CH₂)₃N(C₂H₅)₂ both positions on triazine | Cl | H |
| 62 | 3,3 | NH(CH₂)₃−N(morpholine) both positions on triazine | −NH(CH₂)₃N(C₂H₅)₂ | H |
| 63 | 3,3 | NH(CH₂)₃NHCH(CH₃)₂ both positions on triazine | −NH(CH₂)₃N(C₂H₅)₂ | H |
| 64 | 3,3 | NHCH₂C(CH₃)₂CH₂N(CH₃)₂ both positions on triazine | −NH(CH₂)₃N(C₂H₅)₂ | H |

EXAMPLE 65

9.2 Parts of cyanuric chloride are suspended in 100 parts water and 100 parts ice and reacted with 16.4 parts of 4-amino-2-methylacetanilide. The temperature is allowed to rise to 25° whilst at the same time maintaining the pH between 5 and 6 by the addition of sodium carbonate. After there is no further visible reaction, the reaction mass is heated to 60° whilst maintaining the pH constant at 5 to 6 and stirring for 3 hours at this temperature. At the end of this time the condensation is finished and the compound of formula 65a

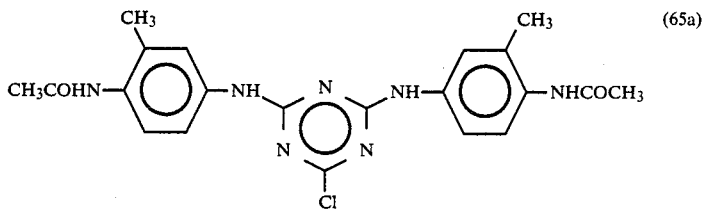

(65a)

is formed.

Without isolation, the suspension is reacted with 25 parts of N,N-diethylaminopropylamine and stirred for 10 hours at 92°. After this period is over this condensation step is finished. The suspension is filtered hot and the residue is washed with water. 27 Parts of the compound of formula 65b

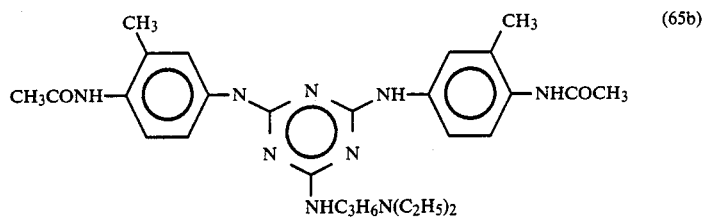

is formed (which is grey in colour).

27 Parts of the residue are suspended in 200 parts of water and reacted with 50 parts of a 30% hydrochloric acid solution.

The mixture is then heated to 95° C. After about one hour saponification has finished. The solution is then clear filtered after cooling.

The solution contains 20 parts of the compound of formula 65c

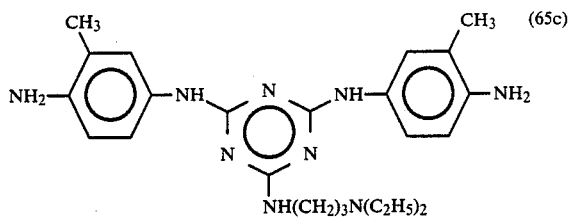

which can be used as a tetraazo component.

Instead of using 4-amino-2-methylacetanilide an equivalent amount of one of the following can be used:
4-amino-2-methoxyacetanilide
4-amino-2-chloroacetanilide
4-amino-2,5-dimethylacetanilide
4-amino-2-methoxy-5-methylacetanilide
4-amino-2,5-dimethoxyacetanilide
4-aminoacetanilide
3-aminoacetanilide 60 Parts by volume of an aqueous hydrochloric acid solution (containing 3 parts of the compound of formula 65c) is brought to 0° and 14 parts by volume of a 1N sodium nitrite solution are dropwise added. A yellow tetrazo solution is formed and 10 parts of the compound of formula 65d

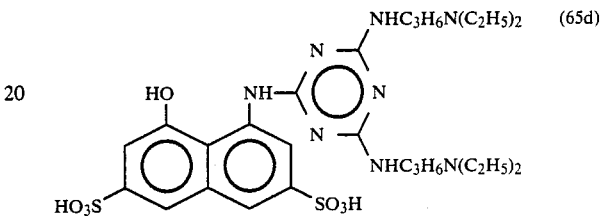

dissolved in 70 parts of water are added. The pH is regulated between 6 and 8 by the addition of sodium carbonate and coupling occurs. A blue dyestuff solution results. After coupling 40 parts of sodium chloride and 10 parts of 30% aqueous sodium hyroxide are added. The resulting precipitate is filtered dried to obtain 26 parts of the compound of formula 65e

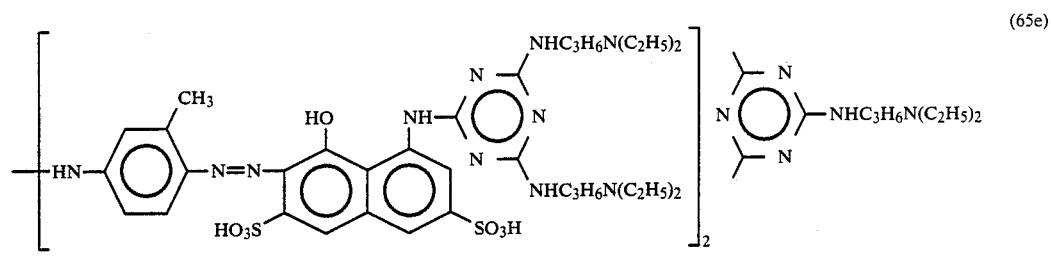

In acid addition salt form this compound dyes paper neutral blue tone. The back water is colourless and the dyed paper obtains very good wet fastnesses.

EXAMPLES 66 TO 88

Compounds of the formula

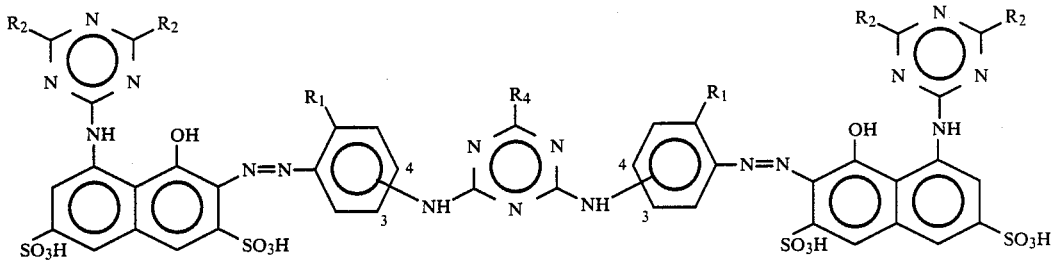

in which $R_1$, $R_2$ and $R_4$ and the positions S of the amino groups on the phenyl groups are given in Table 2, are formed by a method analogous to that of Example 65 from appropriate reactants.

TABLE 2

| EX. NO. | S | $R_1$ | $R_2$ | $R_4$ |
|---|---|---|---|---|
| 66 | 4,4 | —$CH_3$ | —$NHC_3H_6N(C_2H_5)_2$ | —$NHC_3H_6N(CH_3)_2$ |
| 67 | 4,4 | —$CH_3$ | " | —$NHC_2H_4NH_2$ |
| 68 | 4,4 | —$CH_3$ | " | —N⟨piperazine⟩N—$CH_3$ (H on ring) |
| 69 | 4,4 | —$CH_3$ | " | —NH—C₆H₄—$\overset{\oplus}{N}(CH_3)_3 Cl^{\ominus}$ |
| 70 | 4,4 | —$CH_3$ | " | —N⟨piperazine⟩$\overset{\oplus}{N}(CH_3)_2$ $Cl^{\ominus}$ |
| 71 | 4,4 | —$CH_3$ | —$NHC_3H_6N(CH_3)_2$ | —$NHC_3H_6N(CH_3)_2$ |
| 72 | 4,4 | —$OCH_3$ | —$NHC_3H_6N(C_2H_5)_2$ | —$NHC_3H_6N(C_2H_5)_2$ |
| 73 | 4,4 | —$OCH_3$ | " | —N⟨piperazine⟩N—$CH_3$ |
| 74 | 4,4 | —$OCH_3$ | " | —NH—C₆H₄—$\overset{\oplus}{N}(CH_3)_3 Cl^{\ominus}$ |
| 75 | 4,4 | H | —$NHC_3H_6N(CH_3)_2$ | —$NHC_3H_6N(CH_3)_2$ |
| 76 | 4,4 | H | —$NHC_3H_6N(C_2H_5)_2$ | —$NHC_3H_6N(C_2H_5)_2$ |
| 77 | 4,4 | H | —$NHNHCOCH_2\overset{\oplus}{N}(CH_3)_3 \overset{\ominus}{Cl}$ | —$NHC_3H_6N(C_2H_5)_2$ |
| 78 | 4,4 | —$CH_3$ | " | " |
| 79 | 4,4 | —$OCH_3$ | " | " |
| 80 | 4,4 | H | —$NHC_3H_6N(C_2H_5)_2$ | —$NHNHCOCH_2\overset{\oplus}{N}(CH_3)_3 \overset{\ominus}{Cl}$ |
| 81 | 4,4 | —$CH_3$ | " | " |
| 82 | 4,4 | —$OCH_3$ | " | " |
| 83 | 4,4 | Cl | " | —$NHC_3H_6N(C_2H_5)_2$ |
| 84 | 4,4 | Cl | —$NHC_3H_6N(C_2H_5)_2$ | —$NHC_3H_6N(CH_3)_2$ |
| 85 | 3,3 | H | " | —$NHC_3H_6N(C_2H_5)_2$ |
| 86 | 3,3 | Cl | " | " |
| 87 | 3,3 | —$OCH_3$ | " | " |
| 88 | 3,3 | —$CH_3$ | " | " |

The nuances of the above Examples 66 to 88 are given below:

| Nuance | Example Nos. |
|---|---|
| neutral blue | 66 to 71, 78, 81 |
| greenish blue | 72 to 74, 79, 82 |
| reddish blue | 75 to 77, 80 |
| blueish-red | 83, 84 |
| bordeaux | 85 |
| rubin red | 86 |
| violet | 87 |
| reddish violet | 88 |

EXAMPLE 89

4.6 Parts of 4-aminoacetanilide are reacted with 8 parts of 30% hydrochloric acid in 100 parts of water and 100 parts of ice. The product is diazotised with aqueous sodium nitrite solution. To the resulting solution 26 parts of the compound of formula 89a

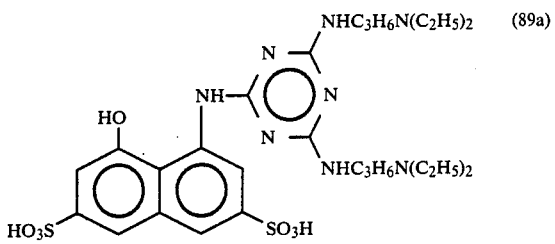

are added, the pH being regulated to 7.5 with sodium carbonate. A violate dyestuff is produced. After filtering and washing the residue, it is stirred in 300 parts of water and dissolved with 30 parts by volume concentrated hydrochloric acid. This solution is then warmed to 90° to 95° C. and is stirred for 3 hours at this temperature. At the end of the 3 hours saponification has finished and 380 parts by volume of a blue dyestuff solution containing 22.4 parts of the compound of formula out and is then filtered. After drying, 21 parts of a dark powder result containing 6.3 parts of the compound of Example 77. The aminoazo dyestuff of formula 89b can be prepared directly according to DOS No. 2,555,515 using p-phenylenediamine instead of 4-aminoacetanilide.

EXAMPLE 90

44 Parts of the dyestuff of Example 72 are stirred in 500 parts of water and the pH is brought to 6 with glacial acetic acid, at which pH the dyestuff dissolves to form a solution. 14.7 Parts of $CuSO_4$ pentahydrate dissolved in 100 parts of a 25 % ammonia solution are added. The solution is heated to 93° and stirred for 8 hours. At the end of this period copperisation has almost been completed. The mass is stirred when cold and reacted with 75 parts by volume of a 30 % NaOH solution. The majority of dyestuff present precipitates. The residue is then filtered and dried under mild conditions. The dyestuff of formula 90a

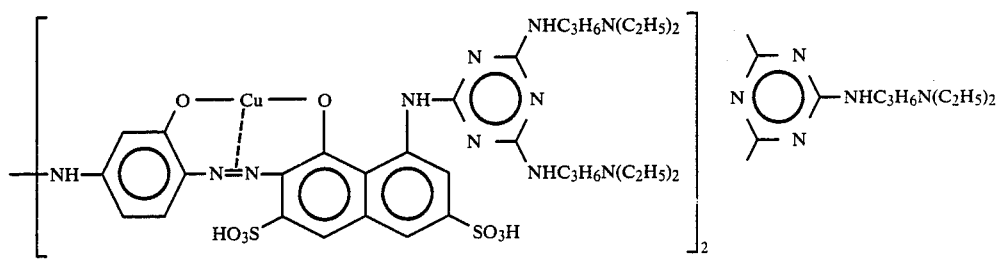

89b

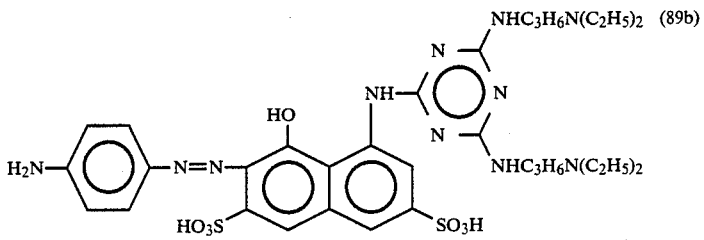

results. When in acid addition salt form, it dyes paper a violet-blue tone. The backwater of such dyeings is practically colourless and the dyed paper shows very good wet fastness properties. Good light fastness properties have also been found.

EXAMPLE 91

7.7 Parts of the compound of formula 89b (described in Example 89) are dissolved in 300 parts of water at a pH value of 6 and the solution is cooled to 5°. 1.9 Parts of cyanuric chloride, dissolved in 10 parts of acetone, are added dropwise so that the temperature does not rise over 5°. The mass is stirred at this temperature for 3 hours and the pH is then brought to 5 to 6 by adding sodium acetate. After checking with the aid of a thin layer chromatograph that no aminoazo dyestuff is present, 7.2 parts of the compound of formula 91a result.

To 135 parts by volume of this solution 32 parts by volume of a 4N sodium carbonate solution are added to bring the solution to a pH of 6. 0.92 Part of cyanuric chloride dissolved in 10 parts by volume acetone, is added and the reaction mixture is stirred for 30 minutes at room temperature. The pH is held at 6 by the addition of a 4N sodium carbonate solution. Finally the solution is heated to 60° and the pH is held for a further 2 hours at 5 to 6. At the end of this 2 hour period, the condensation has ended. 2 Parts by volume of N,N-diethylaminopropylamine are then added.

The temperature is raised to 90° and the acetone is distilled off. The reaction mass is then held at 90° to 95° for 4 hours and at the end of this 4 hour period condensation has finished. After cooling to room temperature, 50 parts of NaCl are added. The dyestuff precipitates

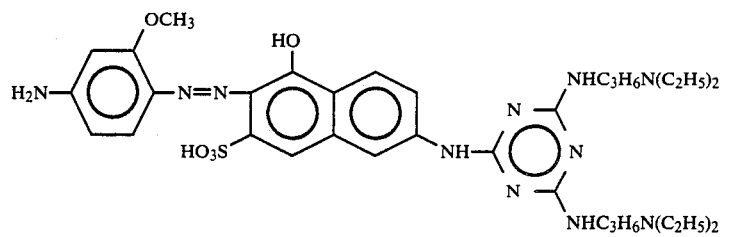

(91a)

are added and the temperature is slowly raised to 60°, maintaining the pH at 5 to 6 by the further addition of sodium acetate. The mass is then allowed to cool to room temperature and is reacted with 50 parts of sodium chloride. 20 Parts of 30 % NaOH is then added and the majority of the dyestuff present precipitates out. The residue is filtered and dried and the dyestuff of formula 91b -continued

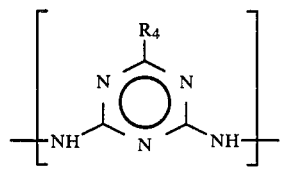

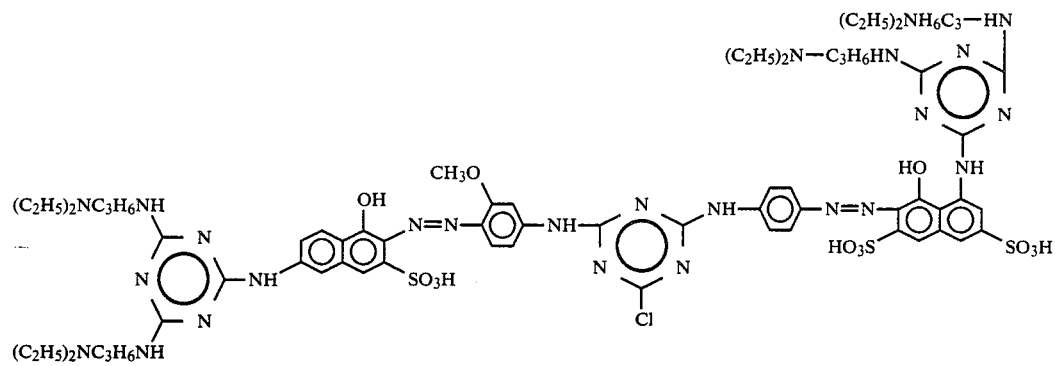

(91b)

results. When in acid addition salt form the dyestuff of formula 91b dyes paper a violet-blue nuance. The backwater is colourless and the wet fastness properties of the dyed paper are very good.

The dyestuff of formula 91b can be stirred in the presence of N,N-diethylaminopropylamine at 95° to 98° C. until exchange of the chlorine atoms for the amine occurs. The resulting dyestuff dyes paper a blue tone with good wet fastness and light fastness properties.

EXAMPLES 92 TO 95

Compounds of the formula

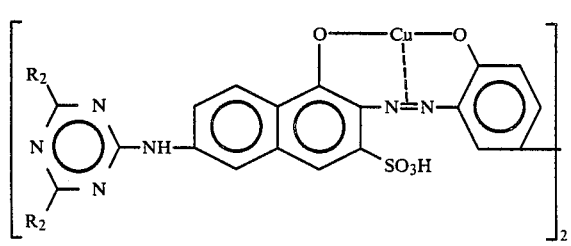

in which the symbols $R_2$ and $R_4$ are defined in Table 3, can be made by a method analogous to that of Example 89 from appropriate starting materials

TABLE 3

| Ex. No. | $R_2$ | $R_4$ | nuance |
|---|---|---|---|
| 92 | —NH(CH$_2$)$_3$—N(C$_2$H$_5$)$_2$ | —NH(CH$_2$)$_3$N(C$_2$H$_5$)$_2$ | red-orange |
| 93 | " | —NHCH$_2$CH$_2$OH | red-orange |
| 94 | " | —N⟨   ⟩N—CH$_3$ | red-orange |
| 95 | —NHCH$_2$CH(CH$_3$)NH$_2$ | —NH(CH$_2$)$_3$N(C$_2$H$_5$)$_2$ | red-orange |

EXAMPLES 96 TO 99

Compounds of the formula

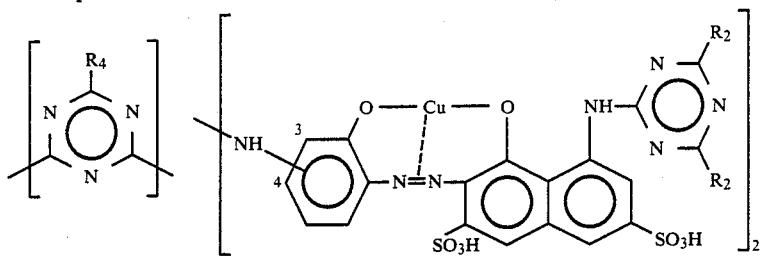

in which $R_2$, $R_4$ and the position S of the —NH— radicals on the phenyl rings are given in Table 4 below, can be prepared from appropriate reactants by a method analogous to that of Example 90.

TABLE 4

| Example No. | $R_2$ | $R_4$ | S | nuance |
| --- | --- | --- | --- | --- |
| 96 | —NHC$_3$H$_6$N(C$_2$H$_5$)$_2$ | —NHC$_3$H$_6$N(C$_2$H$_5$)$_2$ | 3 | violet |
| 97 | —NHNHCOCH$_2$—⊕N⟨C$_5$H$_5$⟩ Cl⊖ | —NHC$_3$H$_6$N(CH$_3$)$_2$ | 4 | violet-blue |
| 98 | —NH—⟨C$_6$H$_4$⟩—⊕N(CH$_3$)$_3$A⊖ | " | 3 | violet-blue |
| 99 | —NHC$_3$H$_6$N(CH$_3$)$_2$ | —N⟨piperazine⟩N—CH$_3$ | 3 | violet |

DYEING EXAMPLE A

70 Parts of chemically bleached sulphite cellulose (of pinewood) and 30 parts of chemically bleached sulphite cellulose (of birchwood) are ground in a Hollander in 2000 parts of water. 0.2 Parts of the dyestuff described in Example 1 are sprinkled into this pulp. After mixing for 20 minutes, paper is produced from this pulp. The absorbent paper obtained in this way is dyed scarlet. The waste water is practically colourless.

DYEING EXAMPLE B 0.5 Parts of the dyestuff of Example 1 are dissolved in 100 parts of hot water and cooled to room temperature. This solution is added to 10 parts of chemically bleached sulphite cellulose which have been ground in a Hollander with 2000 parts of water. After thorough mixing for 15 minutes, sizing takes place.

Paper which is produced from this matter has a scarlet shade of average intensity, with good wet fastness properties.

DYEING EXAMPLE C

An absorbent length of unsized paper is drawn through a dyestuff solution of the following composition at 40° to 50°. 0.5 Parts of the dyestuff of Example 1, 0.5 parts of starch and 99.0 parts of water. The excess dyestuff solution is squeezed out through two rollers. The dried length of paper is dyed scarlet with good fastness.

DYEING EXAMPLE D

2 Parts of the dyestuff of Example 1 are dissolved at 40° in 4000 parts of softened water. 100 Parts of premoistened cotton fabric are entered into the bath, which is heated for 30 minutes to boiling temperature. The bath is kept at boiling temperature for 1 hour, and the water which evaporates is replaced from time to time. The dyeing is then removed from the liquor, rinsed with water and dried. The dyestuff is adsorbed practically quantitatively on the fibres; the dye bath is practically colourless. A reddish-yellow dyeing is obtained with good light fastness and good wet fastness.

In Dyeing Examples A to D an appropriate amount of any one of Dyestuffs 2 to 88 in liquid or granulate preparation form may be used instead of the amount of the dyestuff of Example 1 to produce good dyeings with good fastness properties.

APPLICATION EXAMPLE E

100 Parts freshly tanned and neutralised chrome leather are agitated for 30 minutes in a vessel with a dyebath of 250 parts water at 55° C. and 0.5 parts of the dyestuff of Example 1 in acid addition salt form, and then treated in the same bath for 30 minutes with 2 parts of an anionic fatty liquor based on sulphonated train oil. The leather is then dried and prepared in the normal way, giving a leather evenly dyed in a black tone.

Other low affinity vegetable-tanned leathers can similarly be dyed by known methods.

In the above Dyeing Examples A to E instead of using the dyestuff of Example 1 an appropriate amount of any one of Examples 2 to 99 may be used.

What is claimed is:

1. A metal-free compound of the formula

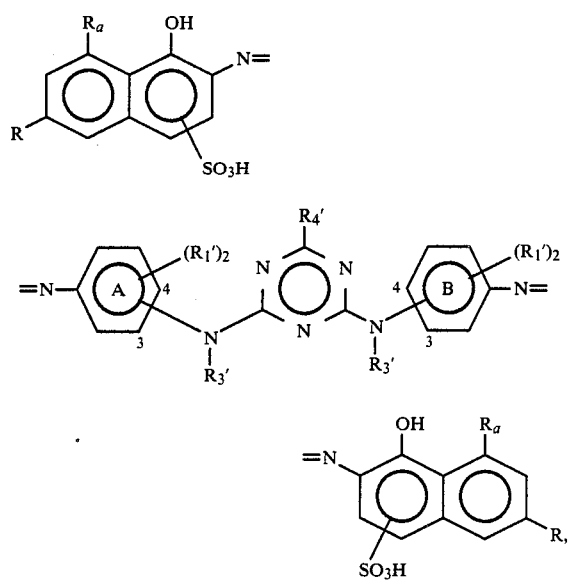

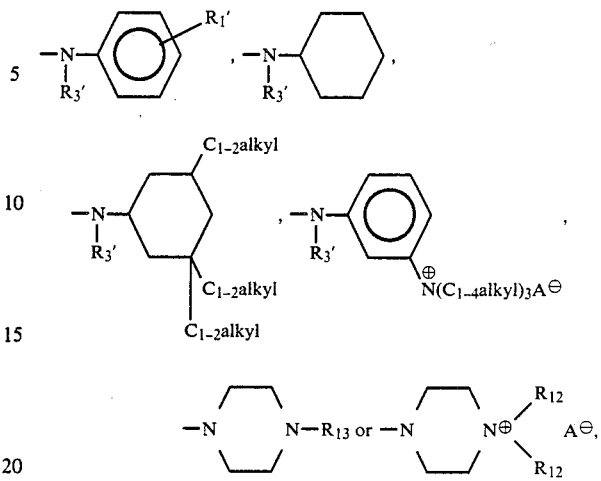

a 1:1 or 1:2 metal complex of a metallizable metal-free compound of said formula or an acid addition salt of a metal-free compound of said formula or of a 1:1 or 1:2 metal complex of a metallizable metal-free compound of said formula,
wherein
each R is sulfo and each $R_a$ is independently —$NR_5'R_6'$ or
each R is independently —$NR_5'R_6'$ and each $R_a$ is hydrogen,
wherein
$R_6'$ is

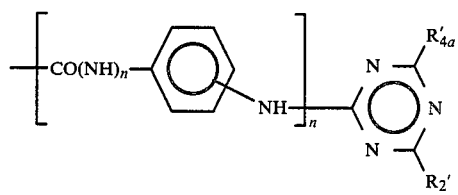

or —CO—$(CH_2)_{m'}$—$K_a'$,
wherein
$K_a'$ is —$N(R_7')_2$, —$N^\oplus(R_8')_2R_9'A^\ominus$, —$N^\oplus(R_8')_2$—$A_1$—$N(R_7')_2A^\ominus$ or —$N^\oplus(R_8')_2$—$A_1$—$N^\oplus(R_8')_2R_9'$ $2A^\ominus$,
$R_2'$ is —$NR_5'R_{20}'$, morpholino, piperidino,

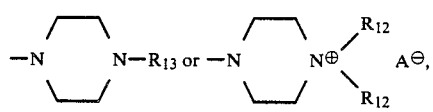

m' is 1, 2 or 3,
each n is independently 0 or 1, and
$R_{4a}'$ is as defined below, and
each of $R_4'$ and $R_{4a}'$ is independently chloro, bromo, methyl, phenyl, hydroxy, methoxy, amino, N—$C_{1-4}$alkyl-N—$C_{3-4}$alkylamino, N,N-di-($C_{2-4}$hydroxyalkyl)amino, —$NR_5'R_{20}'$, morpholino, piperidino,

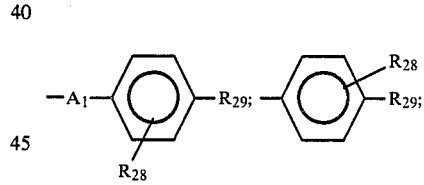

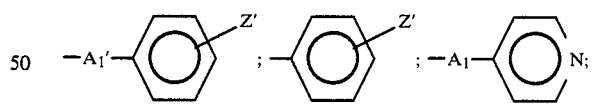

wherein
each $R_1'$ is independently hydrogen, chloro, bromo, methyl, methoxy or sulfo,
each $R_3'$ is independently hydrogen or methyl,
each $R_{12}$ is independently $C_{1-4}$alkyl,
each $R_{13}$ is independently hydrogen, $C_{1-4}$alkyl or $C_{1-4}$alkyl substituted by amino,
each $R_{20}'$ is independently $C_{1-12}$alkyl; $C_{1-12}$hydroxyalkyl; alkyl having a maximum of 12 carbon atoms which is interrupted by 1 to 3 radicals selected from —$NR_7$— and —$N^\oplus(R_8)_2$—$A^\ominus$; alkyl having a maximum of 12 carbon atoms which is substituted by hydroxy and interrupted by 1 to 3 radicals selected from —$NR_7$— and —$N^\oplus(R_8)_2$—$A^\ominus$; —NH-CO—$CH_2$—Z; —$CH_2$—CONH—$A_1$—Z; —$A_1$—Z;

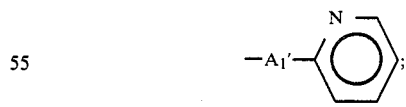

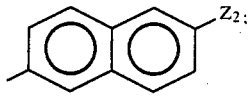

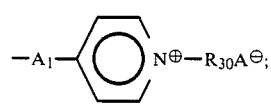

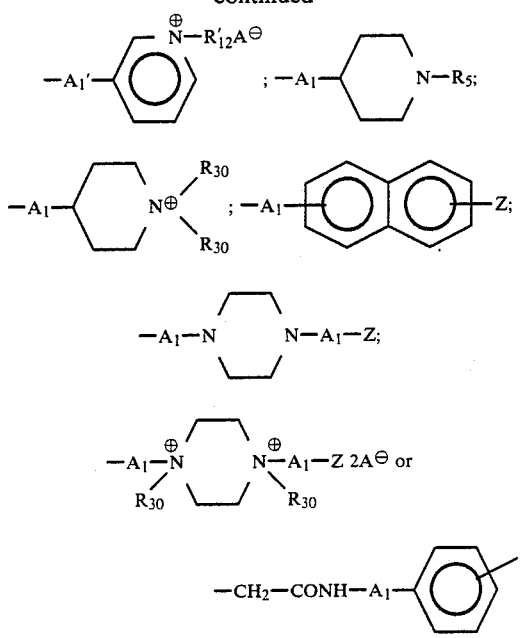

wherein
A₁' is linear or branched C₁₋₈alkylene or linear or branched alkylene having a maximum of 8 carbon which is interrupted by —O—, —S— or —NR₅'—,
R₅ is hydrogen or C₁₋₄alkyl,
R₁₂ is methyl or ethyl,
R₂₈ is halo, hydroxy, nitro, C₁₋₄alkyl or C₁₋₄alkoxy,
R₂₉ is —N(R₇')₂, —N⊕(R₈')₂R₉'A⊖, —CO—A₂—Z₁, —NHCO—A₂—Z₁, —CONH—A₂—Z₁, —SO₂NH—A₂—Z₁, —A₂—Z₁ or —NHNHCO—CH₂—Z₁,
wherein A₂ is linear or branched C₁₋₈alkylene, and
Z₁ is —N(R₇')₂ or —N⊕(R₈')₂R₉'A⊖,
each R₃₀ is independently C₁₋₄alkyl, Z is —N(R₇)₂, —N⊕(R₈)₂R₉A⊖, —A₁—Z₁, —CONH—A₁—Z₁, —NHCO—A₁—Z₁, —CO—A₁—Z₁, —SO₂NH—A₁—Z₁ or —NHNHCO—CH₂—Z₁,
wherein
Z₁ is as defined above, and
Z' is dimethylamino, trimethylammonium A⊖, —CONH—A₁'—Z₂, —SO₂NH—A₁'—Z₂, —A₁—Z₂, —NHNHCO—CH₂—Z₂ or —CO—A₁'—Z₂,
wherein Z₂ is —N(R₇")₂ or —N⊕(R₈")₂R₉"A⊖,
wherein
each A₁ is independently linear or branched C₁₋₈alkylene; linear or branched alkylene having a maximum of 8 carbon atoms which is interrupted by —O—, —S— or —NR₅'—; or linear or branched C₃₋₈alkenylene,
wherein R₅' is as defined below,
each A₁' is independently linear or branched C₁₋₈alkylene or linear or branched alkylene having a maximum of 8 carbon atoms which is interrupted by —O—, —S— or —NR₅'—,
wherein R₅' is as defined below,
each R₅' is independently hydrogen, methyl or ethyl,
each R₇ is independently hydrogen; C₁₋₆alkyl; C₂₋₆alkyl monosubstituted by hydroxy, cyano or halo; phenyl(C₁₋₃alkyl); phenyl(C₁₋₃alkyl) the phenyl group of which is substituted by 1 to 3 substituents selected from halo, C₁₋₄alkyl and C₁₋₄alkoxy; C₅₋₆cycloalkyl or C₅₋₆cycloalkyl substituted by 1 to 3 C₁₋₄alkyl groups, or
—N(R₇)₂ is morpholino, piperidino, pyrrolidino, piperazino, N-methylpiperazino or pyrrolyl,
each R₇' is independently hydrogen; C₁₋₄alkyl; n-C₂₋₃-hydroxyalkyl; 2-cyanoethyl; 2-chloroethyl; phenyl(C₁₋₃alkyl) or phenyl(C₁₋₃alkyl) the phenyl group of which is substituted by 1 to 3 substituents selected from chloro, methyl and methoxy, or
—N(R₇')₂ is morpholino, piperidino, pyrrolidino, piperazino or N-methylpiperazino,
each R₇" is independently hydrogen, methyl or ethyl, or
—N(R₇")₂ is morpholino, piperidino, pyrrolidino, piperazino or N-methylpiperazino,
each R₈ is independently C₁₋₆alkyl; C₂₋₆alkyl monosubstituted by hydroxy, cyano or halo; phenyl(C₁₋₃alkyl); phenyl(C₁₋₃alkyl) the phenyl group of which is substituted by 1 to 3 substituents selected from halo, C₁₋₄alkyl and C₁₋₄alkoxy; C₅₋₆cycloalkyl or C₅₋₆cycloalkyl substituted by 1 to 3 C₁₋₄alkyl groups,
each R₉ is independently C₁₋₄alkyl; C₁₋₄alkyl monosubstituted by phenyl, carbamoyl or cyclohexyl; C₂₋₄alkyl monosubstituted by hydroxy, halo or cyano; C₃₋₈alkenyl or 2-(C₁₋₄alkyl)carbonylmethyl, or
—N⊕(R₈)₂R₉ is pyridinium, pyridinium substituted by 1 to 3 C₁₋₄alkyl groups or

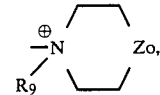

wherein Zo is a direct bond,

—CH₂—, —O—, —S—, —SO—, —SO₂—, —NH—,

—N(C₁₋₄alkyl)-, —N⊕(C₁₋₄alkyl)₂A⊖ or —N—(CH₂)ₚ—NH₂, wherein
p is 2 or 3, and
R₉ is as defined above,
each R₈' is independently C₁₋₄alkyl; n-C₂₋₃hydroxyalkyl; 2-cyanoethyl; 2-chloroethyl; phenyl(C₁₋₃alkyl) or phenyl(C₁₋₃alkyl) the phenyl group of which is substituted by 1 to 3 substituents selected from chloro, methyl and methoxy,
R₉' is methyl, ethyl, propyl, cyanoethyl, hydroxyethyl, chloroethyl, benzyl, allyl, carbamoylmethyl, cyclohexylmethyl or acetylmethyl, or
—N⊕(R₈')₂R₉' is pyridinium, picolinium, lutidinium or

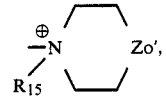

wherein
R₁₅ is methyl or ethyl, and
Zo' is a direct bond,

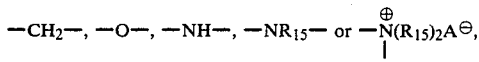

wherein
each $R_{15}$ is independently methyl or ethyl,
each $R_8''$ is independently methyl or ethyl, and
each $R_9''$ is independently methyl, ethyl or benzyl, or
—$N^\oplus(R_8'')_2R_9''$ is pyridinium, picolinium or

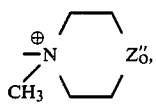

wherein $Z_0''$ is

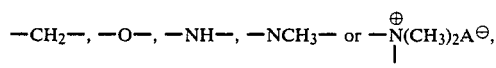

wherein each $A^\ominus$ is independently a non-chromophoric anion, with the provisos that (i) the sum of the cationic groups and protonatable basic groups exceeds the number of sulfo groups by at least one, (ii) the —$NR_3'$— radical attached to Ring A is in the 3- or 4-position thereof and the —$NR_3'$— radical attached to Ring B is in the 3- or 4-position thereof, and (iii) when each R is —$NR_5'R_6'$ wherein $R_6'$ is

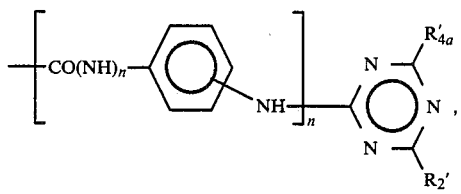

then each n is 0, the —$NR_3'$— radicals attached to Rings A and B are in the 3-position of each, and each $R_2'$ and $R_{4a}'$ is other than

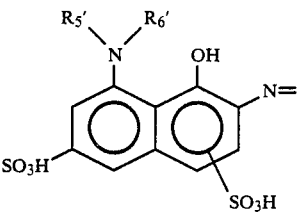

2. A metal-free compound according to claim 1 or an acid addition salt thereof.

3. A metal-free compound according to claim 2 having the formula

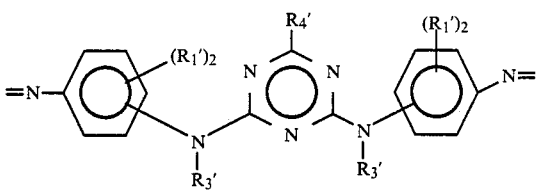

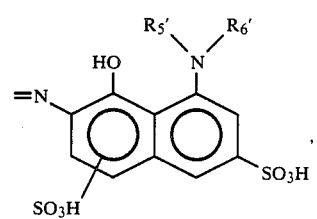

or an acid addition salt thereof.

4. A metal-free compound according to claim 2 having the formula

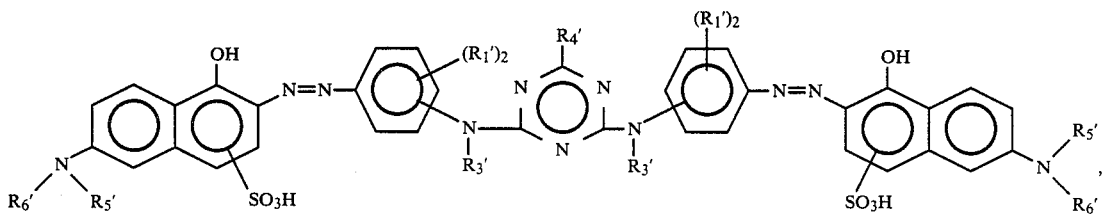

or an acid addition salt thereof.

5. A 1:1 or 1:2 metal complex according to claim 1 or an acid addition salt thereof.

6. A 1:1 or 1:2 metal complex according to claim 5 having the formula

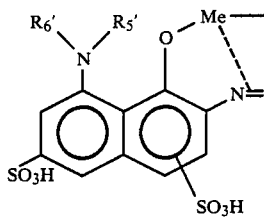

or an acid addition salt thereof, wherein
each Me is independently a 1:1 metal complex-forming metal atom or
each Me is independently a 1:2 metal complex-forming metal atom.

7. A 1:1 or 1:2 metal complex according to claim 5 having the formula

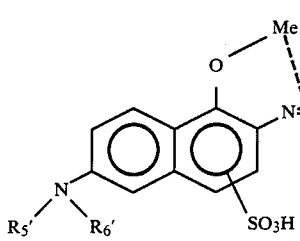

or an acid addition salt thereof, wherein
each Me is independently a 1:1 metal complex-forming metal atom or
each Me is independently a 1:2 metal complex-forming metal atom.

8. A metal-free compound according to claim 1 having the formula

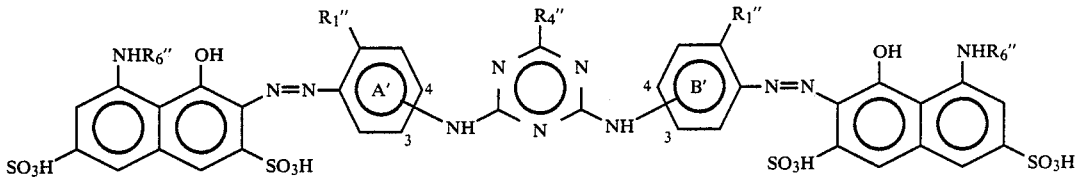

or

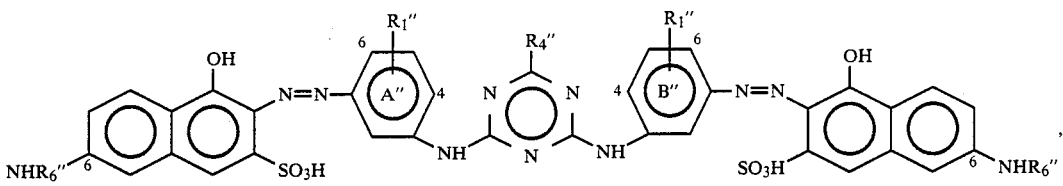

a 1:1 or 1:2 metal complex of a metallizable metal-free compound of either of said formulae or an acid addition salt of a metal-free compound of either of said formulae or of a 1:1 or 1:2 metal complex of a metallizable metal-free compound of either of said formulae, wherein
  each $R_1''$ is independently hydrogen, methyl, methoxy or sulfo,
  each $R_6''$ is independently

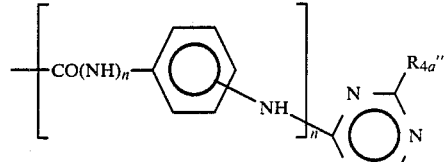

or $-CO-(CH_2)_{m''}-K_a''$, wherein $K_a''$ is $-N(R_7'')_2$, $-\overset{\oplus}{N}(R_8'')_2R_9''\ A^{\ominus}$, $-\overset{\oplus}{N}(R_8'')_2-A_3-N(R_7'')_2\ A^{\ominus}$ or $-\overset{\oplus}{N}(R_8'')_2-A_3-\overset{\oplus}{N}(R_8'')_2R_9''\ 2A^{\ominus}$, wherein $A_3$ is $-(CH_2)_s-$, -continued
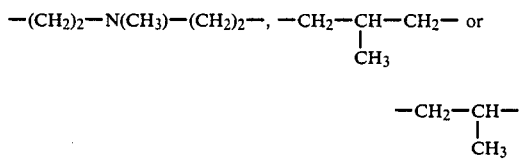

wherein
s is 2, 3, 4, 5 or 6,
$R_2''$ is

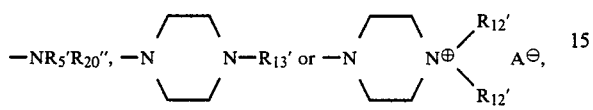

$m''$ is 1 or 2,
each n is independently 0 or 1, and
$R_{4a}''$ is as defined below, and
each of $R_4''$ and $R_{4a}''$ is independently chloro, methyl, methoxy, hydroxy, amino,

—NHC$_2$H$_4$OH, —N(C$_2$H$_4$OH)$_2$, —NR$_5'$R$_{20}''$,

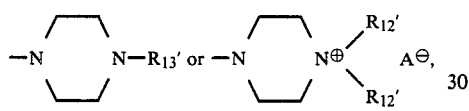

wherein
each $R_{13}'$ is independently hydrogen, methyl or —C$_2$H$_4$—NH$_2$, and
each $R_{20}''$ is independently —(CH$_2$)$_p$—NR$_7''$—(CH$_2$)$_p$—NR$_7''$R$_{12}'$, —(CH$_2$)$_p$—$\overset{\oplus}{N}$(R$_8''$)$_2$—(CH$_2$)$_p$—$\overset{\oplus}{N}$(R$_8''$)$_2$R$_{12}'$ 2A$^\ominus$,

—NHCO—CH$_2$—Z$_2$, —CH$_2$—CONH—A$_1'$—Z$_2$, —A$_1'$—Z$_2$,

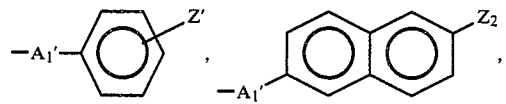

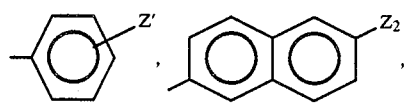

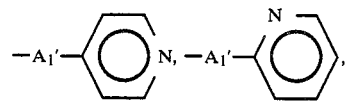

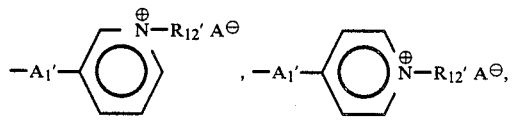

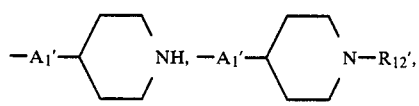

-continued
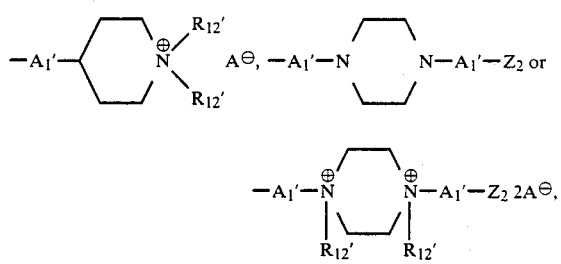

wherein
$Z'$ is dimethylamino, trimethylammonium A$^\ominus$, —CONH—A$_1'$—Z$_2$, —SO$_2$NH—A$_1'$—Z$_2$, —A$_1$—Z$_2$, —NHNHCO—CH$_2$—Z$_2$ or —CO—A$_1'$—Z$_2$, and
each p is independently 2 or 3,
wherein
each A$_1$ is linear or branched C$_{1-8}$alkylene; linear or branched alkylene having a maximum of 8 carbon atoms which is interrupted by —O—, —S— or —NR$_5'$—; or linear or branched C$_{3-8}$alkenylene,
each A$_1'$ is independently linear or branched C$_{1-8}$alkylene or linear or branched alkylene having a maximum of 8 carbon atoms which is interrupted by —O—, —S— or —NR$_5'$—,
each R$_{12}'$ is independently methyl or ethyl, and
each Z$_2$ is independently —N(R$_7''$)$_2$ or —N$^\oplus$(R$_8''$)$_2$R$_9''$A$^\ominus$,
wherein
each R$_5''$ is independently hydrogen, methyl or ethyl,
each R$_7''$ is independently hydrogen, methyl or ethyl, or
—N(R$_7''$)$_2$ is morpholino, piperidino, pyrrolidino, piperazino or N-methylpiperazino,
each R$_8''$ is independently methyl or ethyl,
each R$_9''$ is independently methyl, ethyl or benzyl, or
—N(R$_8''$)$_2$R$_9''$ is pyridinium, picolinium or

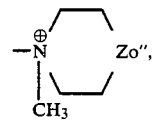

wherein

Zo" is —CH$_2$—, —O—, —NH—, —N(CH$_3$)— or

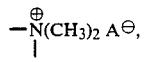

wherein each A$^\ominus$ is independently a non-chromophoric anion, with the provisos that (1) the sum of the cationic groups and protonatable basic groups exceeds the number of sulfo groups by at least one, (2) the —NH— radical attached to Ring A' is in the 3- or 4-position thereof, the —NH— radical attached to Ring B' is in the 3- or 4-position thereof, the R$_1''$ group attached to Ring A" is in the 4- or 6-position thereof, and the R$_1''$ group attached to Ring B" is in the 4- or 6-position thereof, (3) when each —NHR$_6''$ group is in the 6-position of the naphthalene ring to which it is attached and each R$_6''$ is

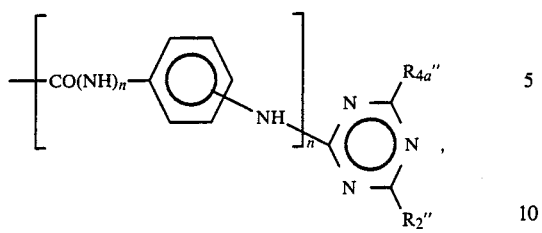

then each n is 0, and (4) each $R_2''$ and $R_{4a}''$ is other than

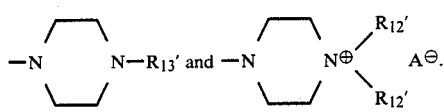

9. A metal-free compound according to claim 8 or an acid addition salt thereof.

10. A metal-free compound according to claim 9 having the formula

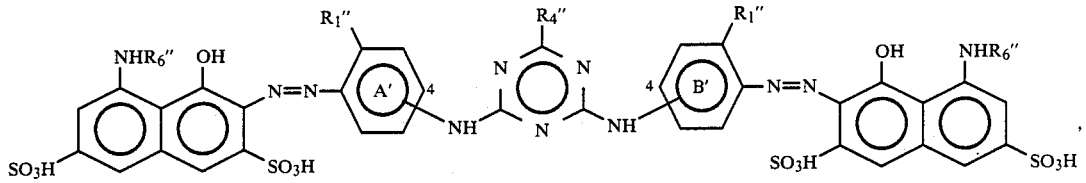

or an acid addition salt thereof.

11. The metal-free compound according to claim 10 having the formula

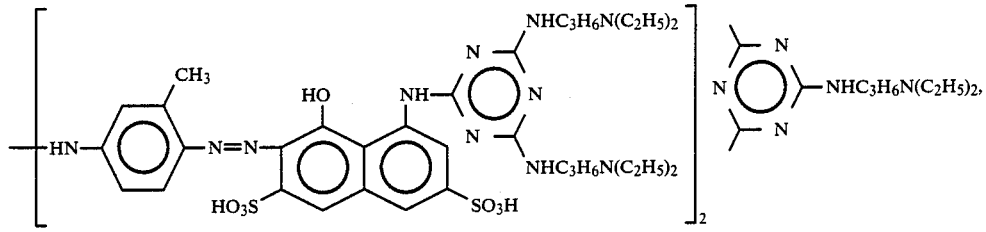

or an acid addition salt thereof.

12. The metal-free compound according to claim 10, or an acid addition salt thereof, wherein

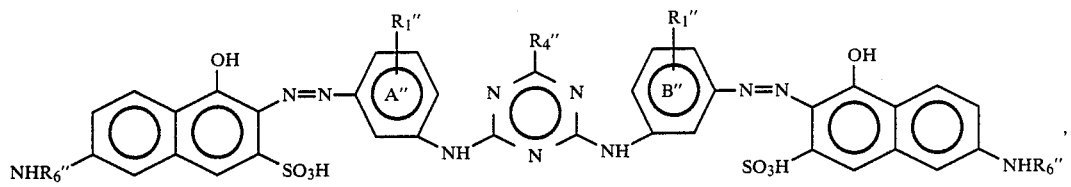

each $R_1''$ is methoxy, $R_4''$ is $-NH-C_3H_6-N(C_2H_5)_2$, each $R_6''$ is

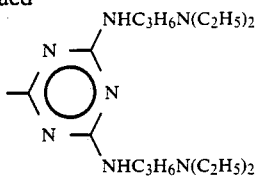

and the —NH— radicals attached to Rings A' and B' are in the 4-position of each.

13. The metal-free compound according to claim 10, or an acid addition salt thereof, wherein each $R_1''$ is hydrogen, $R_4''$ is $-NH-C_3H_6-N(C_2H_5)_2$, each $R_6''$ is

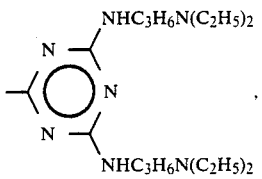

and the —NH— radicals attached to Rings A' and B' are in the 4-position of each.

14. A metal-free compound according to claim 9 having the formula

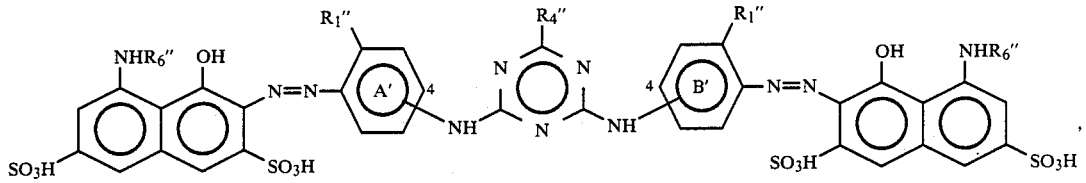

or an acid addition salt thereof.

15. The metal-free compound according to claim 14, or an acid addition salt thereof, wherein each $R_1''$ is hydrogen, $R_4''$ is $-NH-CH_2CH_2-NH_2$, and each $R_6''$ is

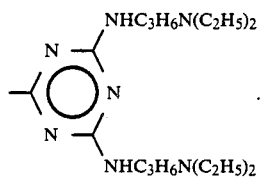

16. A metal-free compound according to claim 14, or an acid addition salt thereof, wherein each $R_1''$ is hydrogen, $R_4''$ is —NH—$C_3H_6$—N($C_2H_5$)$_2$, and each $R_6''$ is

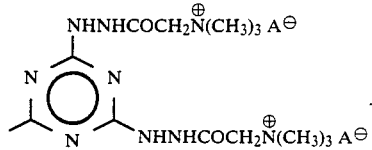

17. The metal-free compound according to claim 14, or an acid addition salt thereof, wherein each $R_1''$ is hydrogen, $R_4''$ is —NH—CH$_2$CH—NH$_2$, and each $R_6''$ is
$\phantom{R_4'' \text{ is —NH—CH}_2}$|
$\phantom{R_4'' \text{ is —NH—CH}_2}$CH$_3$

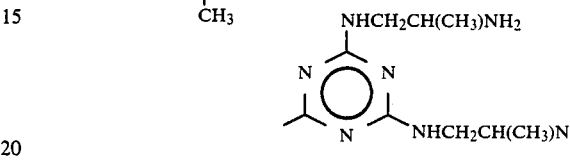

18. A 1:1 or 1:2 metal complex according to claim 8 or an acid addition salt thereof.